(12) United States Patent
Ghoshal et al.

(10) Patent No.: US 9,189,036 B2
(45) Date of Patent: *Nov. 17, 2015

(54) ETHERNET MODULE

(75) Inventors: Sajol Ghoshal, El Dorado Hills, CA (US); John R. Camagna, El Dorado Hills, CA (US); Philip John Crawley, Sacramento, CA (US)

(73) Assignee: AKROS SILICON, INC., San Jose, CA (US)

( * ) Notice: Subject to any disclaimer, the term of this patent is extended or adjusted under 35 U.S.C. 154(b) by 955 days.

This patent is subject to a terminal disclaimer.

(21) Appl. No.: 11/739,565

(22) Filed: Apr. 24, 2007

(65) Prior Publication Data

US 2007/0208961 A1    Sep. 6, 2007

Related U.S. Application Data

(63) Continuation-in-part of application No. 11/445,084, filed on May 31, 2006, now Pat. No. 7,761,719, and a continuation-in-part of application No. 11/287,408, filed on Nov. 23, 2005, now Pat. No. 7,685,452, and a continuation-in-part of application No. 11/207,601, filed on Aug. 19, 2005, now Pat. No. 7,620,825.

(51) Int. Cl.
*G06F 1/26* (2006.01)
*G06F 1/18* (2006.01)

(52) U.S. Cl.
CPC ..................................... *G06F 1/189* (2013.01)

(58) Field of Classification Search
USPC ............... 713/300; 439/517; 379/413, 399.01
See application file for complete search history.

(56) References Cited

U.S. PATENT DOCUMENTS

| | | | | |
|---|---|---|---|---|
| 5,825,259 | A * | 10/1998 | Harpham | 333/22 R |
| 7,656,956 | B2 * | 2/2010 | King | 375/257 |
| 2004/0164619 | A1 * | 8/2004 | Parker et al. | 307/80 |
| 2004/0174819 | A1 * | 9/2004 | Liu et al. | 370/244 |
| 2005/0114473 | A1 * | 5/2005 | Guy et al. | 709/220 |
| 2006/0100799 | A1 * | 5/2006 | Karam | 702/57 |

* cited by examiner

*Primary Examiner* — Thuan N Du

(57) ABSTRACT

In a network device, a connector module comprises a network connector coupled to the connector module in a configuration that transfers power and communication signals and an application connector that comprises serial media independent interface (SMII) pins and power pins. A Power-over-Ethernet (PoE) circuit is coupled between the network connector and the application connector.

24 Claims, 19 Drawing Sheets

ETHERNET MODULE

CROSS REFERENCE TO RELATED APPLICATIONS

This application claims the benefit of priority to as a continuation-in-part and incorporates herein by reference in its entirety for all purposes U.S. patent application Ser. No. 11/207,601 entitled "SYSTEMS AND METHODS OPERABLE TO ALLOW LOOP POWERING OF NETWORKED DEVICES," by John R. Camagna, Sajol Ghoshal and Francois Crepin, filed Aug. 19, 2005; U.S. patent application Ser. No. 11/287,408 entitled "METHOD FOR HIGH VOLTAGE POWER FEED ON DIFFERNTIAL CABLE PAIRS FROM A NETWORK," by John R. Camagna, Philip Crawley, and Sajol Ghoshal, filed Nov. 23, 2005; and U.S. patent application Ser. No. 11/445,084 entitled "ETHERNET MODULE," by Sajol Ghoshal and John R. Camagna, filed May 31, 2006.

BACKGROUND

Many networks such as local and wide area networks (LAN/WAN) structures are used to carry and distribute data communication signals between devices. Various network elements include hubs, switches, routers, and bridges, peripheral devices, such as, but not limited to, printers, data servers, desktop personal computers (PCs), portable PCs and personal data assistants (PDAs) equipped with network interface cards. Devices that connect to the network structure use power to enable operation. Power of the devices may be supplied by either an internal or an external power supply such as batteries or an AC power via a connection to an electrical outlet.

Some network solutions can distribute power over the network in combination with data communications. Power distribution over a network consolidates power and data communications over a single network connection to reduce installation costs, ensures power to network elements in the event of a traditional power failure, and enables reduction in the number of power cables, AC to DC adapters, and/or AC power supplies which may create fire and physical hazards. Additionally, power distributed over a network such as an Ethernet network may function as an uninterruptible power supply (UPS) to components or devices that normally would be powered using a dedicated UPS.

Additionally, network appliances, for example voice-over-Internet-Protocol (VOIP) telephones and other devices, are increasingly deployed and consume power. When compared to traditional counterparts, network appliances use an additional power feed. One drawback of VOIP telephony is that in the event of a power failure the ability to contact emergency services via an independently powered telephone is removed. The ability to distribute power to network appliances or circuits enable network appliances such as a VOIP telephone to operate in a fashion similar to ordinary analog telephone networks currently in use.

Distribution of power over Ethernet (PoE) network connections is in part governed by the Institute of Electrical and Electronics Engineers (IEEE) Standard 802.3 and other relevant standards, standards that are incorporated herein by reference. However, power distribution schemes within a network environment typically employ cumbersome, real estate intensive, magnetic transformers. Additionally, power-over-Ethernet (PoE) specifications under the IEEE 802.3 standard are stringent and often limit allowable power.

Many limitations are associated with use of magnetic transformers. Transformer core saturation can limit current that can be sent to a power device, possibly further limiting communication channel performance. Cost and board space associated with the transformer comprise approximately 10 percent of printed circuit board (PCB) space within a modern switch. Additionally, failures associated with transformers often account for a significant number of field returns. Magnetic fields associated with the transformers can result in lower electromagnetic interference (EMI) performance.

However, magnetic transformers also perform several important functions such as supplying DC isolation and signal transfer in network systems. Thus, an improved approach to distributing power in a network environment may be sought that addresses limitations imposed by magnetic transformers while maintaining transformer benefits.

SUMMARY

According to an embodiment of a network device, a connector module comprises a network connector coupled to the connector module in a configuration that transfers power and communication signals and an application connector that comprises serial media independent interface (SMII) pins and power pins. A Power-over-Ethernet (PoE) circuit is coupled between the network connector and the application connector.

BRIEF DESCRIPTION OF THE DRAWINGS

Embodiments of the invention relating to both structure and method of operation may best be understood by referring to the following description and accompanying drawings:

FIG. 12 (IDF16 FIG. 6B) is a schematic block diagram showing an embodiment of a.

DETAILED DESCRIPTION

Figure 1A:
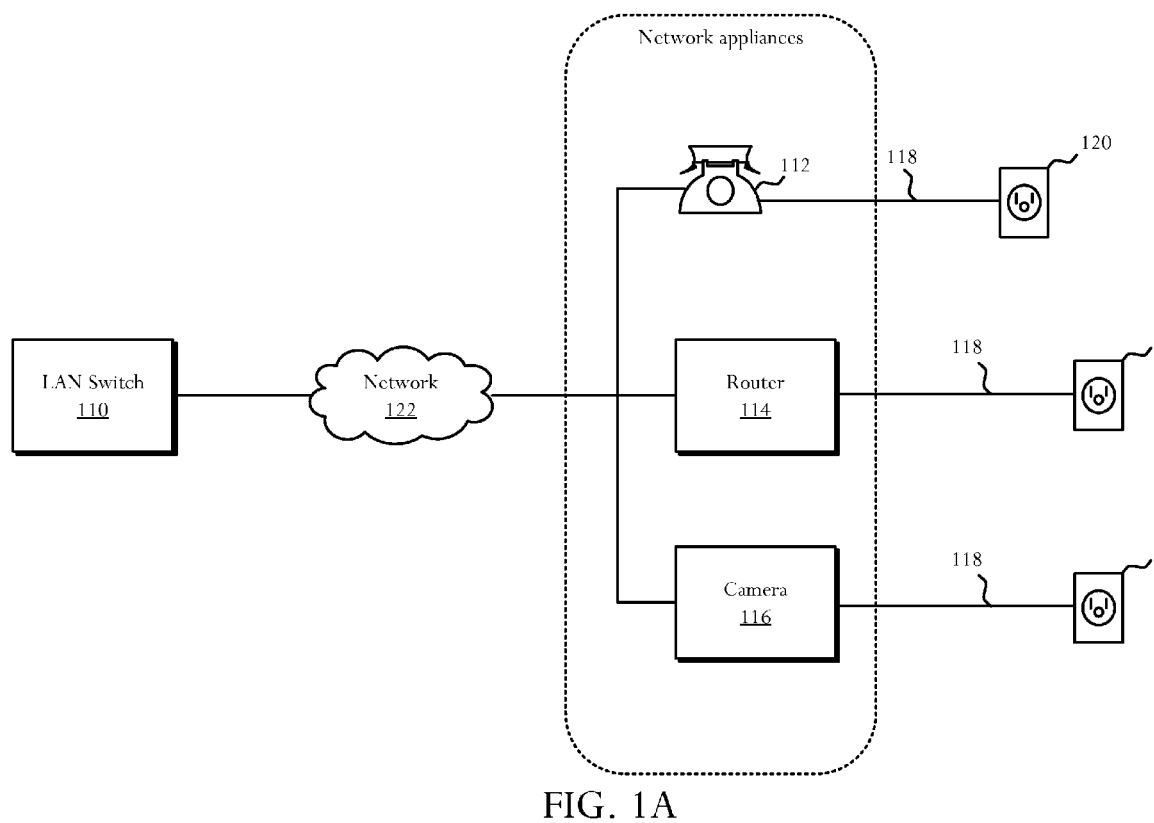
FIGS. 1A and 1B are schematic block diagrams that respectively illustrate a high level example embodiments of client devices in which power is supplied separately to network attached client devices, and a switch that is a power supply equipment (PSE)-capable power-over Ethernet (PoE) enabled LAN switch that supplies both data and power signals to the client devices.

In various embodiments, an Ethernet module can support a power feed on multiple signal pairs. Some embodiments can be in the form of a connector, such as a Registered Jack (RJ)-45 connector, which include an integrated powered device/power sourcing equipment (PD/PSE) controller, a DC-DC controller for a PD implementation, and an Ethernet transformer. Other embodiments can be in the form of a connector, such as a Registered Jack (RJ)-45 connector, which include an integrated powered device/power sourcing equipment (PD/PSE) controller, a DC-DC controller for a PD implementation, and a solid-state transformer, such as a T-connect or T-Less Connect™ solid-state transformer.

Configurations can be implemented which include or exclude an Ethernet Physical Layer (PHY). Configurations can be implemented which include or exclude isolation.

The various modules and structures can be configured with any suitable footprint. In an illustrative embodiment, a standard footprint can be defined to specify an interface size of twenty (20) pins including, for example, eight (8) input RJ-45 pins, six (6) serial media independent interface (SMII) pins including reference clock signal pins, four (4) Management Data Input/Output (MDIO) pins which include two pins for opto-coupling, and two (2) power pins. MDIO is a standard-driven, dedicated-bus arrangement specified in Institute of Electrical and Electronics Engineers (IEEE) RFC802.3. The MDIO interface is implemented by two pins, and MDIO pin and a Management Data Clock (MDC) pin. MDIO is defined in relation to access and modification of registers within physical layer (PHY) devices, and to connection to media access controllers (MACs) in Ethernet systems. A smaller footprint can be defined or configured which can eliminate the two reference clock pins of the SMII interface and/or the two opto-coupling pins of the MDIO.

Figure 3:
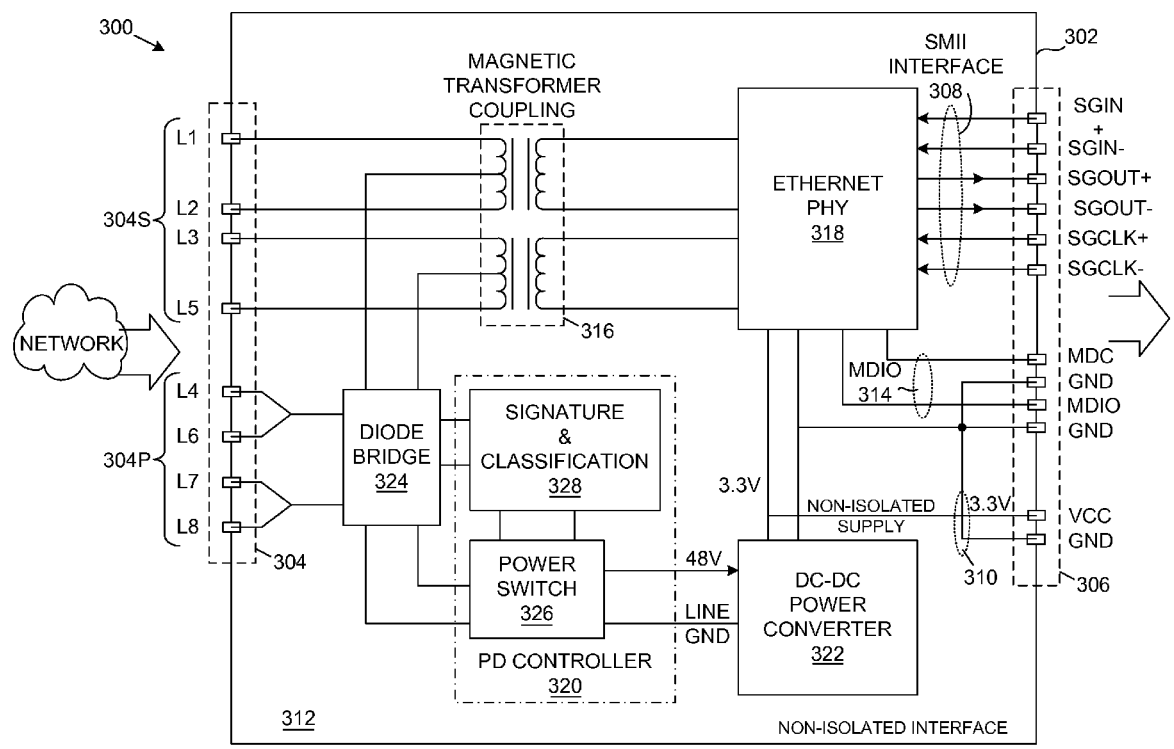
FIG. 3 is a schematic block and circuit diagram depicting an embodiment of a network device in the form of a connector module that is highly suitable for usage in supplying a power feed on multiple pairs.

Referring to FIG. 3, a schematic block and circuit diagram illustrates an embodiment of a network device 300 in the form of a connector module 302 that is highly suitable for usage in supplying a power feed on multiple pairs. The connector module 302 comprises a network connector 304 that transfers power and communication signals and an application connector 306 arranged to include serial media independent interface (SMII) pins 308 and power pins 310. The connector module 302 further comprises a Power-over-Ethernet (PoE) circuit 312 coupled between the network connector 304 and the application connector 306.

In a particular embodiment, the network connector 304 can be an eight-pin Registered Jack (RJ) 45 physical interface. The application connector 306 can be an arrangement that includes the SMII signal interface 308, a Management Data Input/Output (MDIO) interface 314, and a two-pin power interface 310. In various configurations, the SMII signal interface 308 can be a four-pin signal interface or can be a six-pin interface including both signal pins and reference pins. The MDIO interface 314, if included in the connector module 302, can be either a two-pin interface including data and clock lines or a four-pin interface with data, clock or strobe, and opto-coupling lines.

The network device embodiment 300 shown in FIG. 3, the Ethernet PHY 318 is connected to the application interface 306 by a SMII interface 308 and a Management Data Input/Output (MDIO) interface 314 which in combination make up a non-isolated interface.

In the illustrative network device 300, the Power-over-Ethernet (PoE) circuit 312 comprises a magnetic transformer 316, an Ethernet physical layer (PHY) 318, a Powered Ethernet Device (PD) controller 320, and a Direct Current-Direct Current (DC-DC) power converter 322. The magnetic transformer 316 connects to communication signal pins 304S of the network interface 304. The Ethernet physical layer (PHY) 318 is connected between the magnetic transformer 316 and the application interface 306 and is coupled to the application interface 306 by a SMII interface 308. The Powered Ethernet Device (PD) controller 320 is connected to power pins 304P of the network interface 304. In an example arrangement, the Powered Ethernet Device (PD) controller 320 can comprise a power switch circuit 326 and a signature and classification circuit 328. The Direct Current-Direct Current (DC-DC) power converter 322 in connected between the PD controller 320 and power pins 310 of the application interface 306.

The illustrative configuration whereby the transformer 316, PD controller 320, and the Ethernet PHY 318 are contained within the connector module 302, and the Ethernet PHY 318 couples to the application connector 306 via the SMII interface 310 enables a compact connector module 302 with reduced pin count by exploiting the internal transformer 316 to supply power out and the PD controller 320 to generate a supply voltage, such as 48 volts. Combining the PD controller 320 and transformer 316 inside the connector module 302 enables operation switching to take place internal to the module without reserving pins for passing control signals.

Some arrangements of the Power-over-Ethernet (PoE) circuit 312 can include a diode bridge 324 connected between power pins 304P of the network interface 304 and the PD controller 320. The diode bridge 324 can be integrated enabling implementation of the module components in a compact package, or even a single-chip package.

The particular connector module 302 can be constructed as an RJ-45 connector with a transformer-based 10/100 Powered Ethernet (PD) device with an application interface 306 including SMII and power pins. The RJ-45 connector has eight pins arranged in four pairs.

Figure 4A:
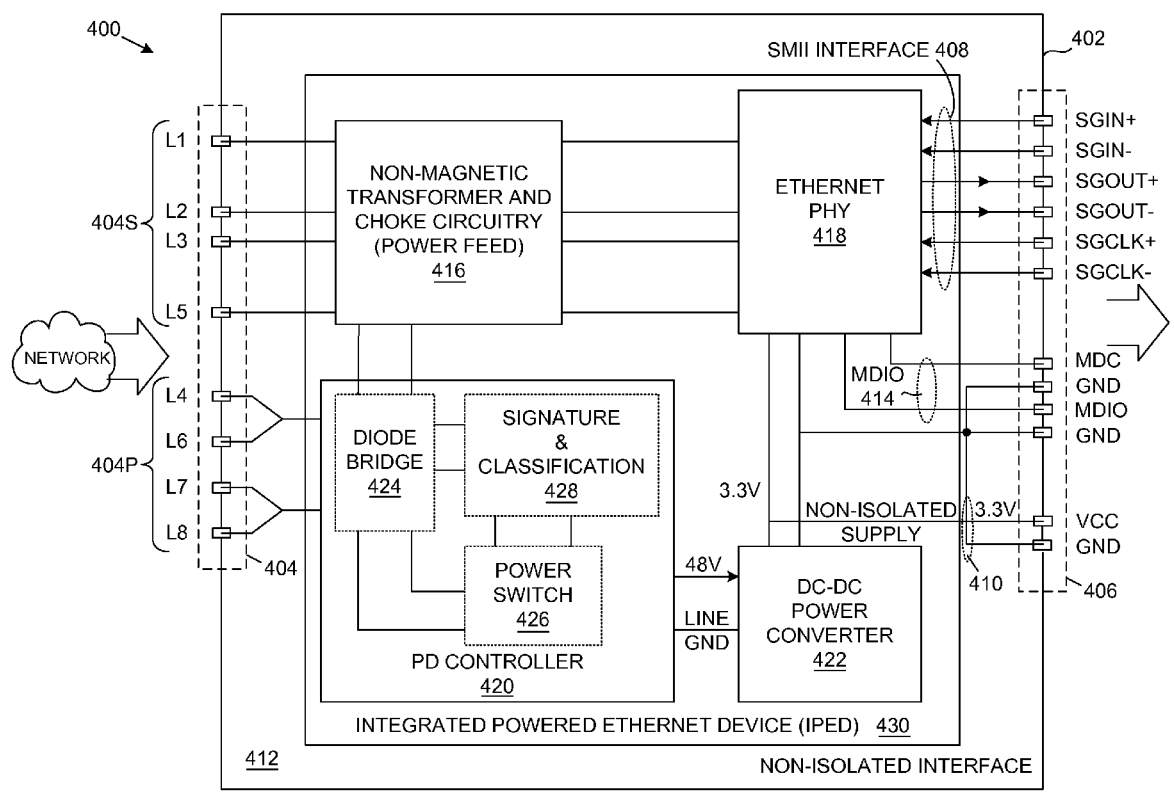
FIG. 4A is a schematic block and circuit diagram showing an embodiment of a network device configured as a connector module with a non-magnetic transformer that enables an integrated single-chip implementation.

Referring to FIG. 4A, a schematic block and circuit diagram illustrates an embodiment of a network device 400 configured as a connector module 402 with a non-magnetic transformer. The non-magnetic transformer can be integrated so that the module components can be implemented, if desired, in an integrated, single-chip arrangement. The connector module 402 comprises a Power-over-Ethernet (PoE) circuit 412 coupled between a network connector 404 and an application connector 406. The illustrative Power-over-Ethernet (PoE) circuit 412 comprises a non-magnetic transformer and choke circuit 416, an Ethernet physical layer (PHY) 418, a Powered Ethernet Device (PD) controller 420, and a Direct Current-Direct Current (DC-DC) power converter 422. The non-magnetic transformer and choke circuit 416 is integrated into the iPED 430 and connected to communication signal pins 404S of the network interface 404.

The Ethernet physical layer (PHY) 418 is integrated into the iPED 430 and connected between the non-magnetic transformer and choke circuit 416 and the application interface 406. The illustrative Ethernet PHY 418 is connected to the application interface 406 by a SMII interface 408 and a Management Data Input/Output (MDIO) interface 414. The Powered Ethernet Device (PD) controller 420 is integrated into the iPED 430 and connected to power pins 404P of the network interface 404. The Direct Current-Direct Current (DC-DC) power converter 422 is integrated into the iPED 430 and connected between the PD controller 420 and power pins 410 of the application interface 406.

The Powered Ethernet Device (PD) controller 420 is depicted as an integrated device integrated into the IPED 430 and further comprising integrated circuit elements including a diode bridge 424 connected to power pins 404P of the network interface 404, a power switch circuit 426 connected to the diode bridge 424, and a signature and classification circuit 428 connected to the diode bridge 424 and the power switch circuit 426. The particular connector module 342 can be constructed as an RJ-45 connector with a transformer-less based 10/100 Powered Ethernet (PD) device with an application interface 306 including SMII and power pins.

Figure 4B:
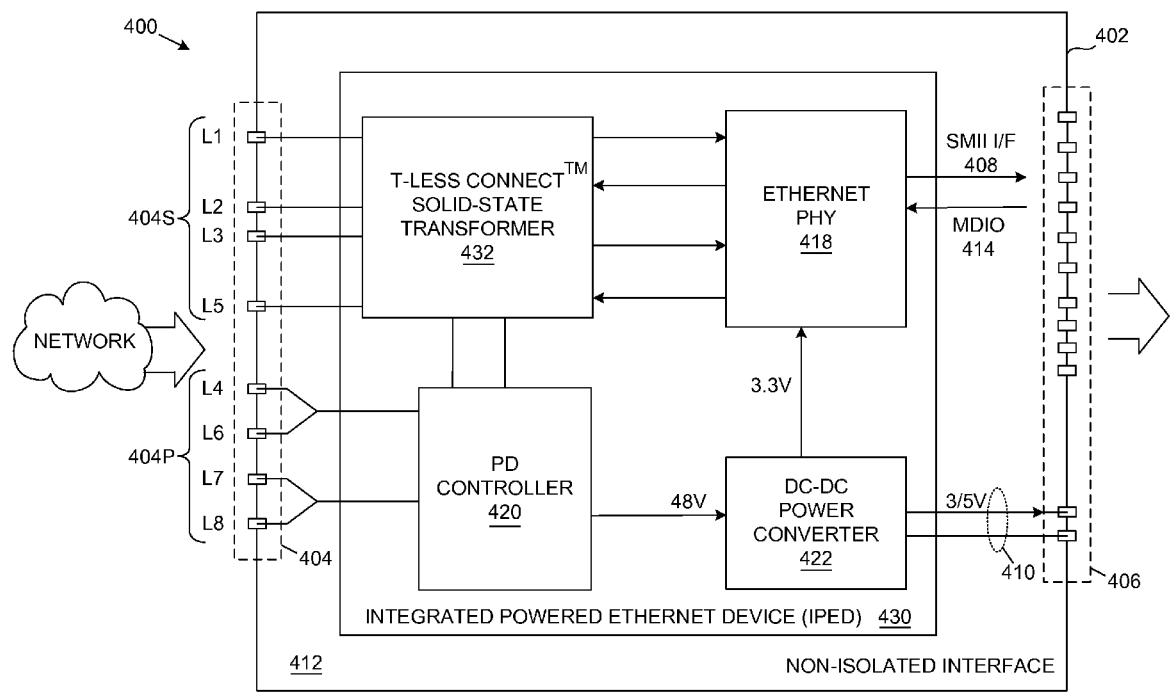
FIG. 4B is a schematic block and circuit diagram illustrating an embodiment of a network device configured as a connector module that includes a T-Less Connect™ solid-state transformer.

Referring to FIG. 4B, a schematic block and circuit diagram illustrates an embodiment of a network device 400 configured as a connector module 402 that includes a T-Less Connect™ solid-state transformer 432. The integrated Powered Ethernet Device (iPED) 430 can be implemented to incorporate a T-Less Connect™ solid-state transformer 432 that separates Ethernet signals from power signals. The T-Less Connect™ solid-state transformer 432 can separate the signal and power signals by floating ground potential of the Ethernet PHY relative to earth ground. The T-Less Connect™ transformer 432 is described more fully in the discussion of FIG. 2.

Figure 5:
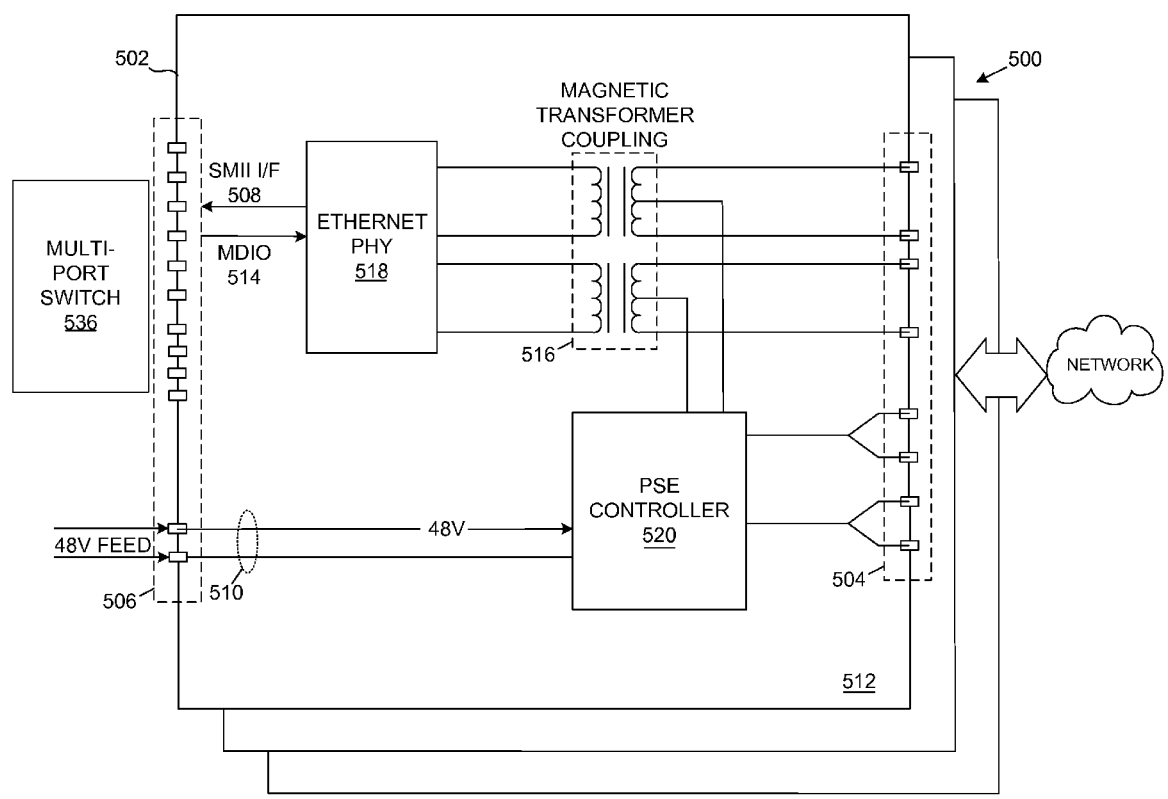
FIG. 5 is a schematic circuit and block diagram depicting an embodiment of a network device configured as a connector module for usage with power sourcing equipment (PSE)

Referring to FIG. 5, a schematic circuit and block diagram depicts an embodiment of a network device 500 configured as a connector module 502 for usage with power sourcing equipment (PSE). The connector module 502 comprises an application connector 506 and a network connector 504 coupled by a Power-over-Ethernet (PoE) circuit 512. The illustrative Power-over-Ethernet (PoE) circuit 512 comprises a magnetic transformer 516, an Ethernet physical layer (PHY) 518, and a Power Sourcing Equipment (PSE) controller 520. The magnetic transformer 516 is connected to communication signal pins 504S of the network interface 504. The Ethernet physical layer (PHY) 518 is connected between the magnetic transformer 516 and the application interface 506. The Ethernet PHY 518 is connected to the application interface 506 by a SMII interface 508 and a Management Data Input/Output (MDIO) interface 514. The Power Sourcing Equipment (PSE) controller 520 is connected between power pins 504P of the network interface 504 and power feed pins 510 of the application interface 506.

In some embodiments, a multi-port switch 536 can be connected to the application interface 506, for example on the exterior side of the application interface 506 with respect to the connector module 502 so that the multi-port switch 536 is coupled to the PoE circuit 512 via the application interface 506.

The depicted connector module 502 is configured as a RJ-45 PSE module including the Ethernet PHY 518.

Figure 6:
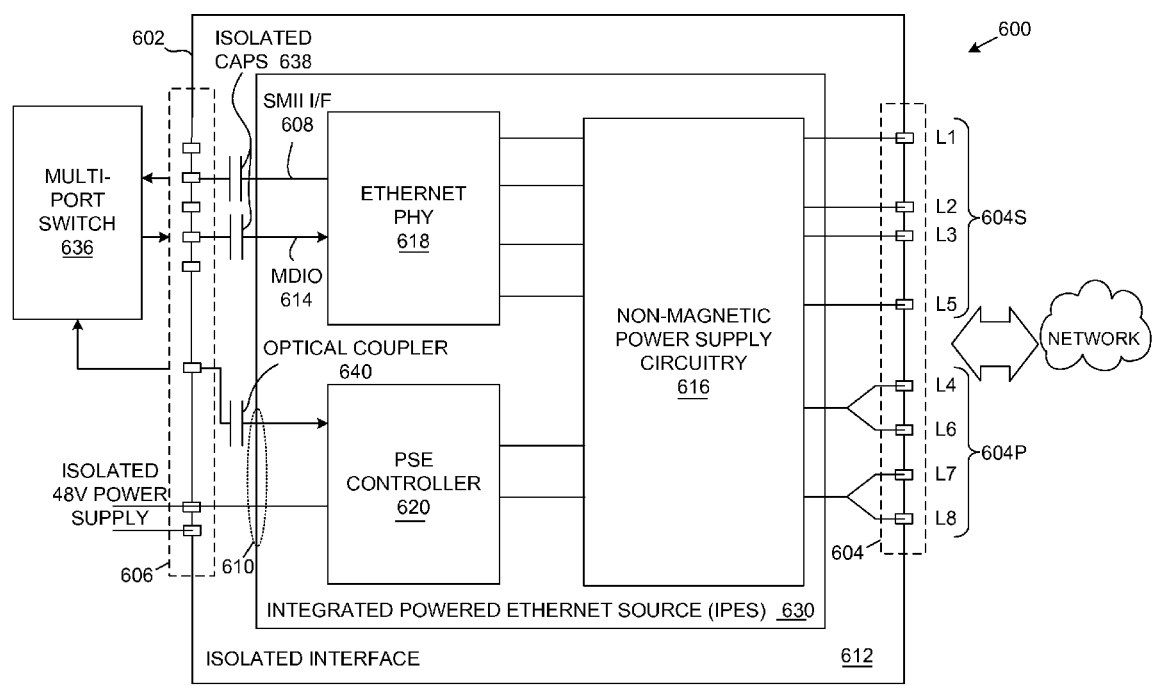
FIG. 6 is a schematic circuit and block diagram showing an embodiment of a network device configured as a connector module for usage with an integrated power sourcing equipment (iPSE) that implements a non-magnetic transformer.

Referring to FIG. 6, a schematic circuit and block diagram depicts an embodiment of a network device 600 configured as a connector module 602 for usage with an integrated power sourcing equipment (iPSE) that implements a non-magnetic transformer and facilitates an integrated single-chip implementation. A power sourcing equipment module 602 has an isolated interface. The connector module 602 comprises an application connector 606 and a network connector 504 coupled by a Power-over-Ethernet (PoE) circuit 612. The Power-over-Ethernet (PoE) circuit 612 has an integrated Powered Ethernet Source (iPES) 630 that comprises a non-magnetic power supply circuit 616, an Ethernet physical layer (PHY) 618, and a Power Sourcing Equipment (PSE) controller 620. The non-magnetic power supply circuit 616 is integrated into the iPES 630 and is connected to communication signal pins 604S and power pins 604P of the network interface 604. The Ethernet physical layer (PHY) 618 is integrated into the iPES 630 and connected between the non-magnetic power supply circuit 616 and the application interface 606. The Ethernet PHY 618 is connected to the application interface 606 by a SMII interface 608 and a Management Data Input/Output (MDIO) interface 614. The SMII standard specifies support for either direct current (DC) or alternating current (AC) operation. The Power Sourcing Equipment (PSE) controller 620 is connected between the non-magnetic power supply circuit 616 and power feed pins 610 of the application interface 606.

In the illustrative connector module 602, the iPES 630 is isolated from application resources by isolation capacitors 638 that are connected between the Ethernet PHY 618 and the application interface 606 and one or more optical couplers 640 connected between the PSE controller 620 and the application interface 606. For example, in an AC implementation, suitable isolation capacitors 638 may be 0.01 µF or any suitable capacitance to supply power supply isolation. Isolation for the MDIO can be supplied by any suitable component such as capacitors or opto-couplers.

In some embodiments, a multi-port switch 636 can be connected to the application interface 606, for example on the exterior side of the application interface 606 with respect to the connector module 602 so that the multi-port switch 636 is coupled to the PoE circuit 612 via the application interface 606.

Figure 7:
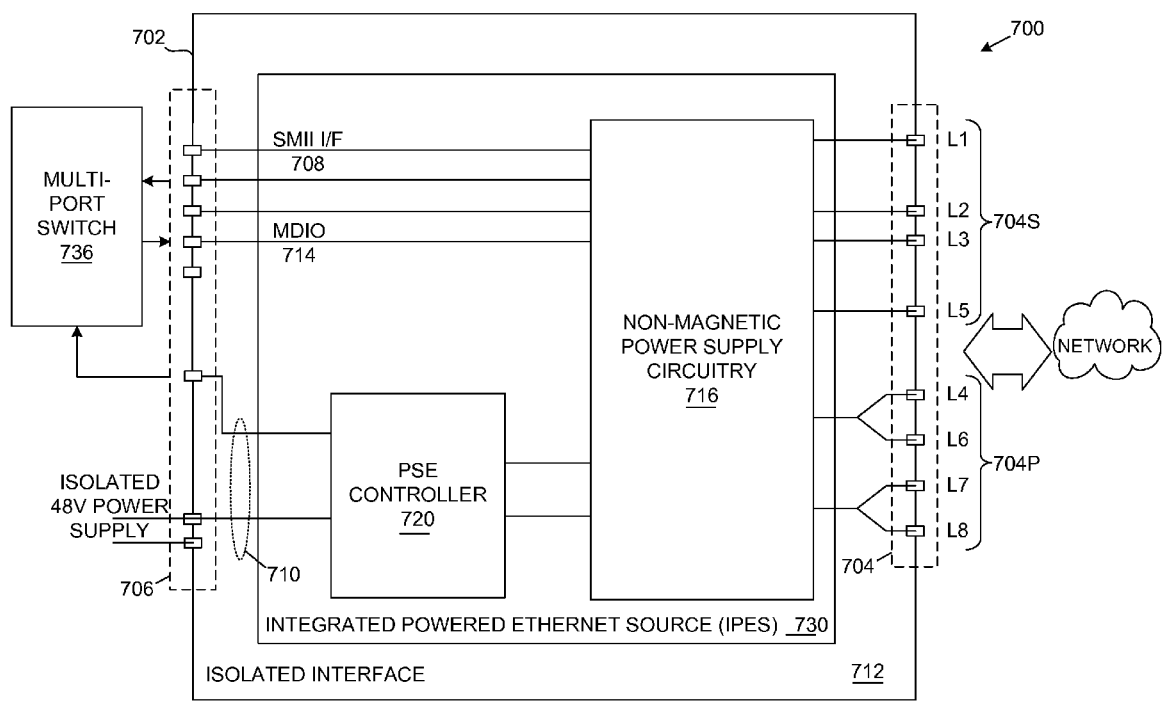
FIG. 7 is a schematic circuit and block diagram that depicts an embodiment of a network device configured for usage as a midspan power sourcing equipment (PSE) connector module.

Referring to FIG. 7, a schematic circuit and block diagram depicts an embodiment of a network device 700 configured for usage as a midspan power sourcing equipment (PSE) connector module 702. The midspan arrangement 702 can be implemented including a network connector 704, such as an RJ-45 connector, with four pairs. The signal can be carried on two pairs and power carried on the other two pairs. The midspan arrangement is a single package that has input connections to a switch supplying an Ethernet signal and to power supplied from exterior to the connector. The midspan connector 702 supplies output power and signal lines.

Typically, the midspan can be configured as a power injector that links basic Ethernet switches to the end power device. A midspan is typically used to deploy installations of powered terminals such as Wireless Local Area Network (WLAN) access points, network security cameras and Internet Protocol (IP) phones.

One of the limitations of a conventional midspan arrangement is handling of power and signal in high-speed Ethernet applications. For example, in typical 10/100 Ethernet signal can be placed on two of four pairs and power placed on the remaining two pairs. However, in gigabit Ethernet, all four pairs carry signal so no lines are available for carrying power. Accordingly, conventional midspans cannot easily handle power and signal for gigabit Ethernet.

In contrast, the various connector arrangements disclosed herein enable efficient usage of Ethernet pathways even for gigabit Ethernet. The midspan connector 702 can include signal conditioning functional elements, for example that filter the communication signals and separate signal and power with little or no signal interference. Signals are distributed using a multi-port switch 736.

The midspan Power Sourcing Equipment (PSE) module 702 comprises a Power-over-Ethernet (PoE) circuit 712 connected between a network connector 704 and an application connector 706. The Power-over-Ethernet (PoE) circuit comprises a non-magnetic power supply circuit 716 and a Power Sourcing Equipment (PSE) controller 720. The non-magnetic power supply circuit 716 is integrated into the midspan PSE module 702 and connected between the network connector 704 and the application connector 706. A Power Sourcing Equipment (PSE) controller 720 is connected between the non-magnetic power supply circuit 716 and power feed pins 710 of the application interface 706.

In some embodiments, a multi-port switch 736 can be connected to the application interface 706 so that the multi-port switch 736 is coupled to the PoE circuit 712 via the application interface 706.

The application connector 706 can be capacitively-coupled to the multi-port switch 736. In various embodiments, the multi-port switch 736 may be internal or external to the midspan connector 702.

Figure 8A:
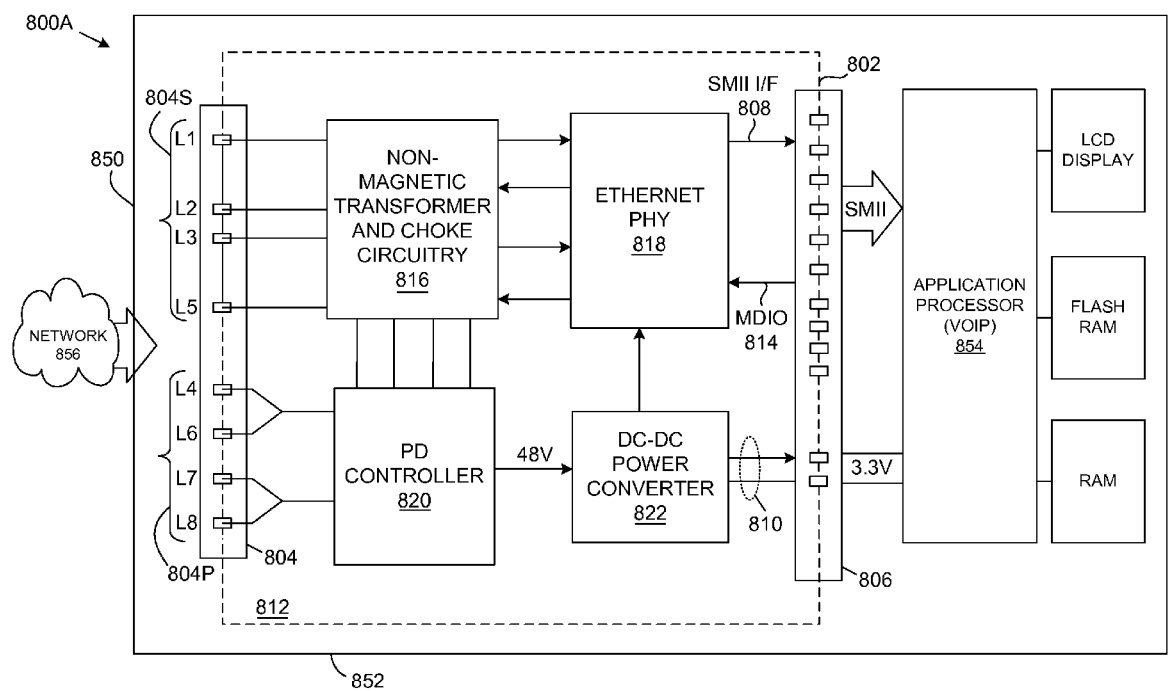
FIGS. 8A, 8B, and 8C are schematic circuit and block diagrams illustrating embodiments of a network device in configurations of network attached appliances.

Referring to FIG. 8A, a schematic circuit and block diagram depicts an embodiment of a network device 800A in the configuration of a network attached appliance 850. The network attached appliance 850 is an example implementation that incorporates a connector module 802. The illustrative network attached appliance 850 comprises a housing 852 and an application processor 854 contained within the housing 852. A connector module 802 is contained within the housing 852 and configured to connect the application processor 854 to a network 856. The connector module 802 comprises a network connector 804, an application connector 806, and a Power-over-Ethernet (PoE) circuit 812. The network connector 804 is coupled to the connector module 802 in a configuration that transfers power and communication signals. The application connector 806 is coupled to the connector module 802 and has serial media independent interface (SMII) pins 808 and power pins 810. The Power-over-Ethernet (PoE) circuit 812 is connected between the network connector 804 and the application connector 806.

In the illustrative embodiment, the Power-over-Ethernet (PoE) circuit 812 includes an integrated Powered Ethernet Device (iPED) 832. The integrated Powered Ethernet Device (iPED) 832 comprises a non-magnetic transformer and choke circuit 816, an Ethernet physical layer (PHY) 818, a Powered Ethernet Device (PD) controller 820, and a Direct Current-Direct Current (DC-DC) power converter 822. The non-magnetic transformer and choke circuit 816 is integrated into the iPED 832 and connected to communication signal pins 804S of the network interface 804. The Ethernet physical layer (PHY) 818 is integrated into the iPED 832 and connected between the non-magnetic transformer and choke circuit 816 and the application interface 806. The Ethernet PHY 818 is connected to the application interface 806 by a SMII interface 808 and a Management Data Input/Output (MDIO) interface 814. The Powered Ethernet Device (PD) controller 820 is integrated into the iPED 832 and connected to power pins 804P of the network interface 804. The Direct Current-Direct Current (DC-DC) power converter 822 is integrated into the iPED 832 and connected between the PD controller 820 and power pins 804P of the application interface 804.

Figure 8B:
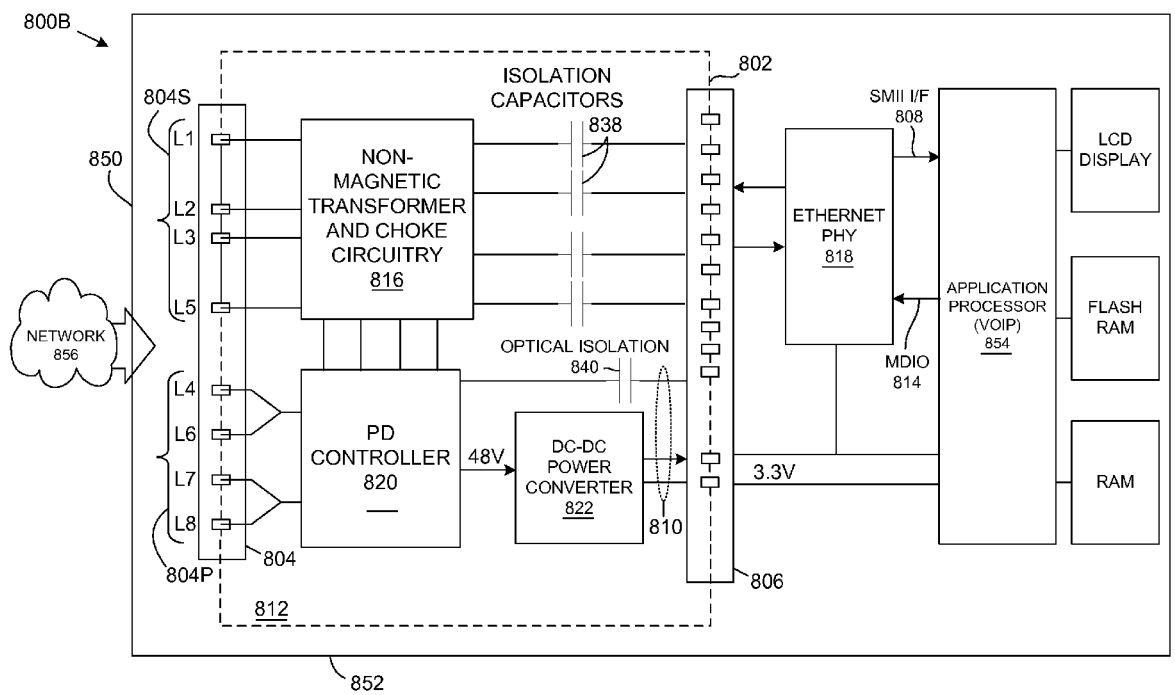

Referring to FIG. 8B, a schematic circuit and block diagram depicts an embodiment of a network device 800B in the configuration of a network attached appliance 850. The network attached appliance 850 is an example implementation that incorporates a connector module 802. The illustrative network attached appliance 850 comprises a housing 852 and an application processor 854 contained within the housing 852. A connector module 802 is contained within the housing 852 and configured to connect the application processor 854 to a network 856. The connector module 802 comprises a network connector 804, an application connector 806, and a Power-over-Ethernet (PoE) circuit 812. The network connector 804 is coupled to the connector module 802 in a configuration that transfers power and communication signals. The application connector 806 is coupled to the connector module 802 and configured for coupling to the application processor 854. The Power-over-Ethernet (PoE) circuit 812 is coupled between the network connector 804 and the application connector 806.

In the illustrative embodiment, the Power-over-Ethernet (PoE) circuit 812 includes an integrated Powered Ethernet Device (iPED) 832. The integrated Powered Ethernet Device (iPED) 832 comprises a non-magnetic transformer and choke circuit 816, a Powered Ethernet Device (PD) controller 820, and a Direct Current-Direct Current (DC-DC) power converter 822. The non-magnetic transformer and choke circuit 816 is integrated into the iPED 832 and coupled between communication signal pins 804S of the network interface 804 and the application interface 804. The Powered Ethernet Device (PD) controller 820 is integrated into the iPED 832 and connected to power pins 804P of the network interface 804. The Direct Current-Direct Current (DC-DC) power converter 822 is integrated into the iPED 832 and connected between the PD controller 820 and power pins 804P of the application interface 804.

In the illustrative embodiment, the connector module 802 further comprises isolation capacitors 838 and at least one optical coupler 840. The isolation capacitors 838 are coupled between the non-magnetic transformer and choke circuit 816 and the application interface 806. The optical coupler 840 is connected between the Powered Ethernet Device (PD) 820 and the application interface 806.

The network attached appliance 850 can further comprise an Ethernet physical layer (PHY) 818 coupled between the application interface 806 and the application processor 854. The Ethernet PHY 818 is coupled to the application processor 854 by a SMII interface 808 and a Management Data Input/Output (MDIO) interface 814.

Figure 8C:
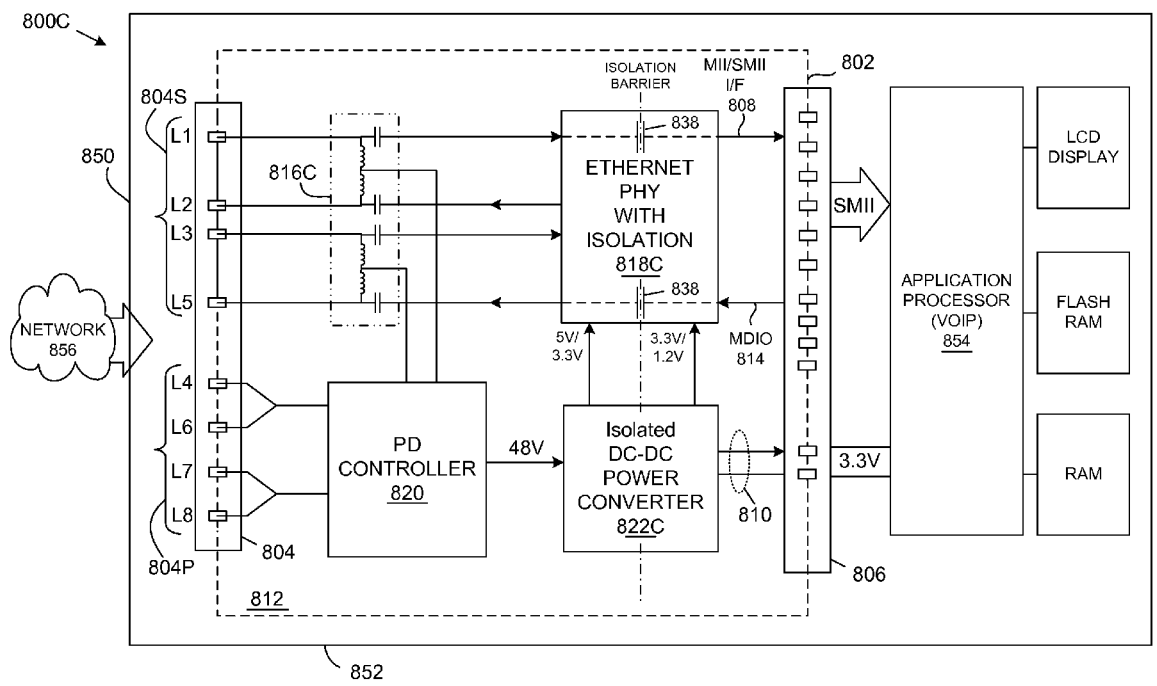

Referring to FIG. 8C, a schematic circuit and block diagram depicts an embodiment of a network device 800C in the configuration of a network attached appliance 850 incorporating a connector module 802 with a Power-over-Ethernet (PoE) circuit 812. In the illustrative embodiment, the Power-over-Ethernet (PoE) circuit 812 includes an integrated Powered Ethernet Device (iPED) 832. The integrated Powered Ethernet Device (iPED) 832 comprises an isolated Ethernet physical layer (PHY) 818C, a Powered Ethernet Device (PD) controller 820, and an isolated Direct Current-Direct Current (DC-DC) power converter 822C. The isolated Ethernet physical layer (PHY) 818C is integrated into the iPED 832 and coupled to the application interface 806 by a SMII interface 808 and a Management Data Input/Output (MDIO) interface 814. The Powered Ethernet Device (PD) controller 820 is integrated into the iPED 832 and connected to power pins 804P of the network interface 804. The isolated Direct Current-Direct Current (DC-DC) power converter 822 is integrated into the iPED 832 and connected between the PD controller 820 and power pins 804P of the application interface 806.

In some embodiments, the integrated Powered Ethernet Device (iPED) 832 can further comprise an autotransformer 816C that is integrated into the iPED 832 and coupled between communication signal pins of the network interface 804 and the application interface 806. Isolation capacitors can be coupled to the autotransformer 816C and integrated into the iPED 832 coupled between communication signal pins of the network interface 804 and the application interface 806.

The isolated Ethernet physical layer (PHY) 818C can have internal isolation, for example by including isolation capacitors 838 coupled to the SMII interface 808 and the MDIO interface 814.

An isolation barrier is formed by isolating components and/or devices in the isolated Ethernet physical layer (PHY) 818C the isolated Direct Current-Direct Current (DC-DC) power converter 822C, thereby isolating the network interface 804 from the application interface 806.

Figure 9A:
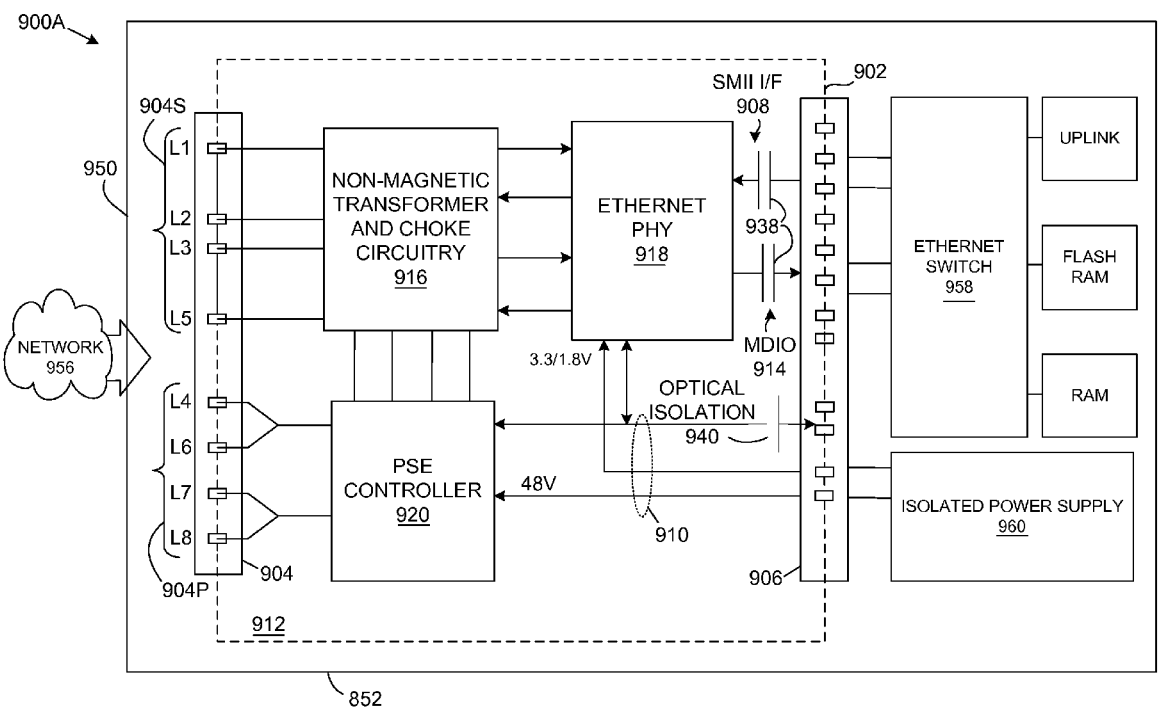
FIGS. 9A, 9B, and 9C are schematic circuit and block diagrams showing embodiments of network devices in configurations of power sourcing equipment (PSE) switch modules.

Referring to FIG. 9A, a schematic circuit and block diagram depicts an embodiment of a network device 900 in the configuration of a power sourcing equipment (PSE) switch module 950. The PSE switch module 950 may be termed a power sourcing equipment appliance and can comprise a housing 952 and an Ethernet switch 958 and an isolated power supply contained within the housing 952. The PSE switch module 950 further comprises a connector module 902 contained within the housing 952 and configured to couple the Ethernet switch 958 and the isolated power supply 960 to a network 956. The connector module comprises a network connector 904, an application connector 906, and a Power-over-Ethernet (PoE) circuit 912. The network connector 904 is connected to the connector module 902 in a configuration that transfers power and communication signals. The application connector 906 is connected to the connector module 902 and comprises serial media independent interface (SMII) pins 908 and power pins 910. The Power-over-Ethernet (PoE) circuit 912 is connected between the network connector 904 and the application connector 906.

In the illustrative embodiment, the Power-over-Ethernet (PoE) circuit 912 can include an integrated Powered Ethernet Source (iPES) 930. The integrated Powered Ethernet Source (iPES) 930 comprises a non-magnetic transformer and choke circuit 912, an Ethernet physical layer (PHY) 918, and a Power Sourcing Equipment (PSE) controller 920. The non-magnetic transformer and choke circuit 912 is integrated into the iPES 930 and is connected to communication signal pins 904S and power pins 904P of the network interface 904. The Ethernet physical layer (PHY) 918 is integrated into the iPES 930 and connected between the non-magnetic transformer and choke circuit 916 and the application interface 906. The Ethernet PHY 918 is connected to the application interface 906 by a SMII interface 908 and a Management Data Input/Output (MDIO) interface 914. The Power Sourcing Equipment (PSE) controller 920 is connected between the non-magnetic transformer and choke circuit 916 and power feed pins 910 of the application interface 906.

In the illustrative PSE switch module 950, the iPES 930 is isolated from the Ethernet switch 958 and the isolated power supply 960 by isolation capacitors 938 that are connected between the Ethernet PHY 918 and the application interface 906 and one or more optical couplers 940 connected between the PSE controller 920 and the application interface 906.

Figure 9B:
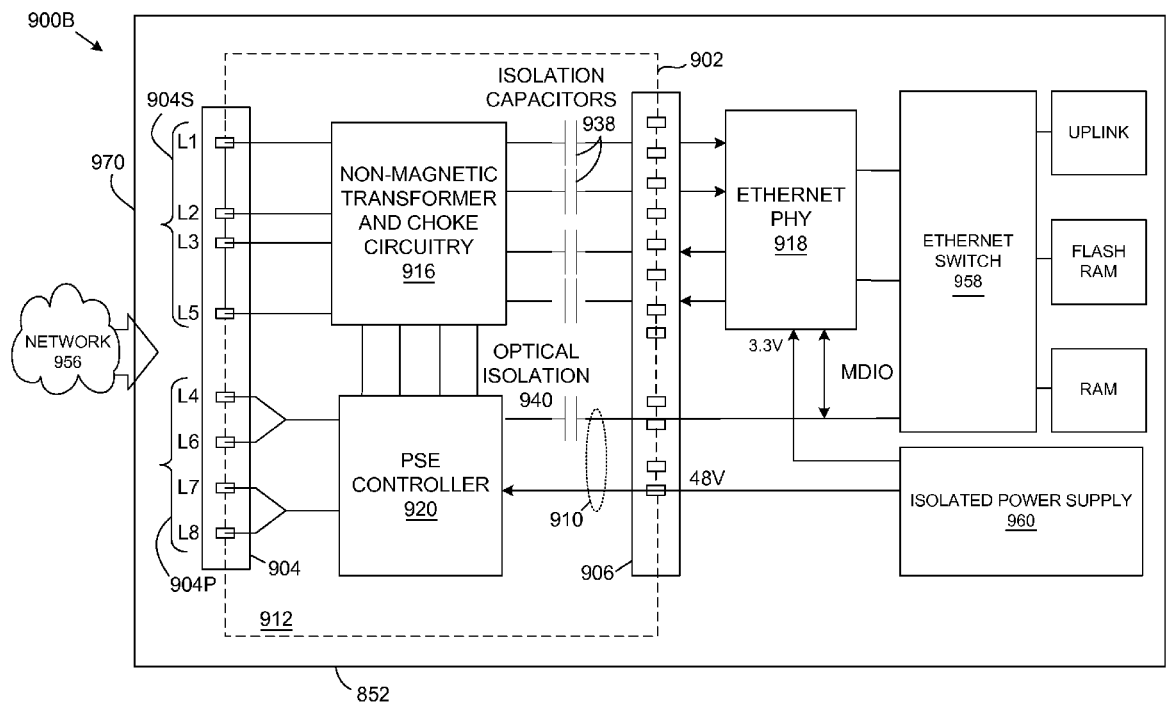

Referring to FIG. 9B, a schematic circuit and block diagram depicts an embodiment of a network device 900 in the configuration of a power sourcing equipment (PSE) switch module 970 or power sourcing equipment appliance with an Ethernet physical layer (PHY) 918 exterior to an integrated Powered Ethernet Source (iPES) 930. The power sourcing equipment appliance 970 comprises the Ethernet physical layer (PHY) 981 coupling an Ethernet switch 958 and an isolated power supply 960 to an application interface 906. The Power-over-Ethernet (PoE) circuit 912 comprises an integrated Powered Ethernet Source (iPES) 930 and a Power Sourcing Equipment (PSE) controller 920. The integrated Powered Ethernet Source (iPES) 930 comprises a non-magnetic transformer and choke circuit 916 integrated into the iPES 930 and connected to communication signal pins 904S and power pins 904P of the network interface 904. The Power Sourcing Equipment (PSE) controller 920 is connected between the non-magnetic transformer and choke circuit 916 and power feed pins 910 of the application interface 906.

The iPES 930 can be isolated from the Ethernet switch 958 and the isolated power supply 960 by isolation capacitors 938 that are connected between the Ethernet PHY 918 and the application interface 906 and one or more optical couplers 940 connected between the PSE controller 920 and the application interface 906.

PSE switch modules 950 and 970 in FIGS. 9A and 9B respectively show example isolation structures.

Figure 9C:
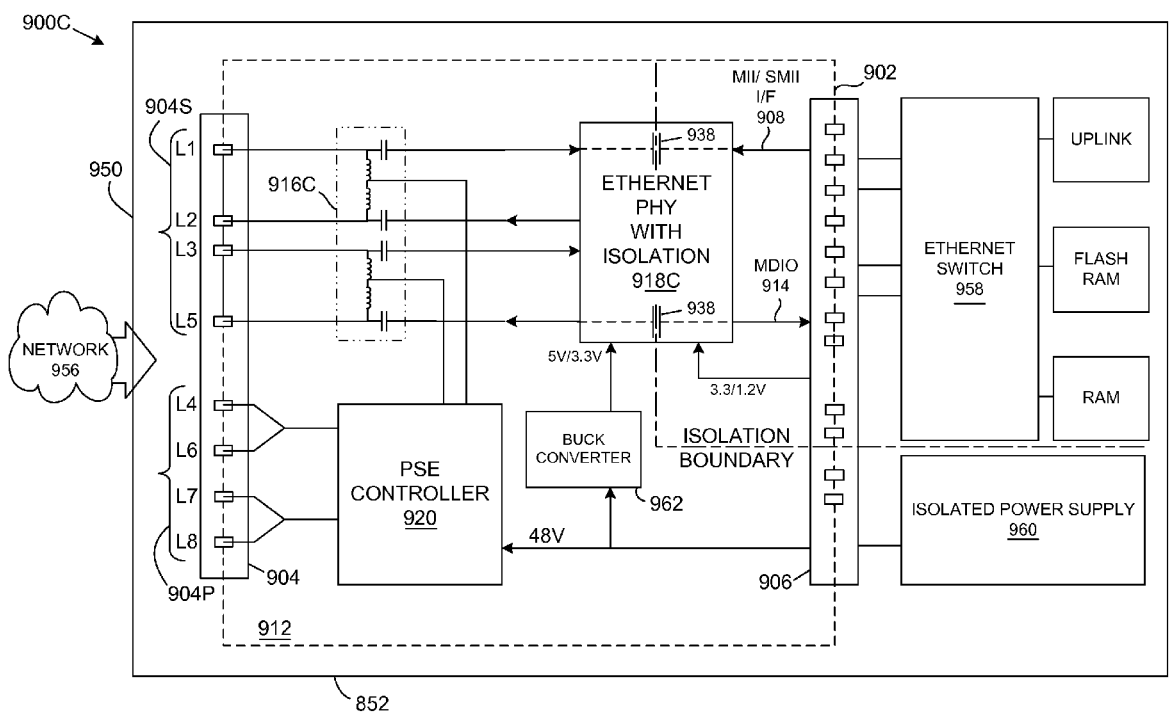

Referring to FIG. 9C, a schematic circuit and block diagram depicts an embodiment of a network device 900C in the configuration of a power sourcing equipment (PSE) switch module 950. The PSE switch module 950 may be termed a power sourcing equipment appliance and can comprise a housing 952 and an Ethernet switch 958 and an isolated power supply contained within the housing 952. The PSE switch module 950 further comprises a connector module 902 contained within the housing 952 and configured to couple the Ethernet switch 958 and the isolated power supply 960 to a network 956. The connector module comprises a network connector 904, an application connector 906, and a Power-over-Ethernet (PoE) circuit 912. The network connector 904 is connected to the connector module 902 in a configuration that transfers power and communication signals. The application connector 906 is connected to the connector module 902 and comprises serial media independent interface (SMII) pins 908 and power pins 910. The Power-over-Ethernet (PoE) circuit 912 is connected between the network connector 904 and the application connector 906.

In the illustrative embodiment, the Power-over-Ethernet (PoE) circuit 912 can include an integrated Powered Ethernet Source (iPES) 930. The integrated Powered Ethernet Source (iPES) 930 comprises an isolated Ethernet physical layer (PHY) 918C, and a Power Sourcing Equipment (PSE) controller 920. The isolated Ethernet physical layer (PHY) 918C is integrated into the iPES 930 and connected to the application interface 906 by a SMII interface 908 and a Management Data Input/Output (MDIO) interface 914. The Power Sourcing Equipment (PSE) controller 920 is to power feed pins 910 of the application interface 906.

In some embodiments, the integrated Powered Ethernet Source (iPES) 930 can further comprise an autotransformer 916C that is integrated into the iPES 930 and coupled between communication signal pins of the network interface 904 and the application interface 906. Isolation capacitors can be coupled to the autotransformer 916C and integrated into the iPES 930 coupled between communication signal pins of the network interface 904 and the application interface 906.

The isolated Ethernet physical layer (PHY) 918C can have internal isolation, for example by including isolation capacitors 938 coupled to the SMII interface 908 and the MDIO interface 914.

A Buck converter 962 can be integrated into the integrated Powered Ethernet Source (iPES) 930 and coupled to a power line supplying the isolated Ethernet physical layer (PHY) 918C from the isolated power supply 960.

An isolation barrier is formed by isolating components and/or devices in the isolated Ethernet physical layer (PHY) 918C, thereby isolating the network interface 904 from the application interface 906.

Figure 10A:
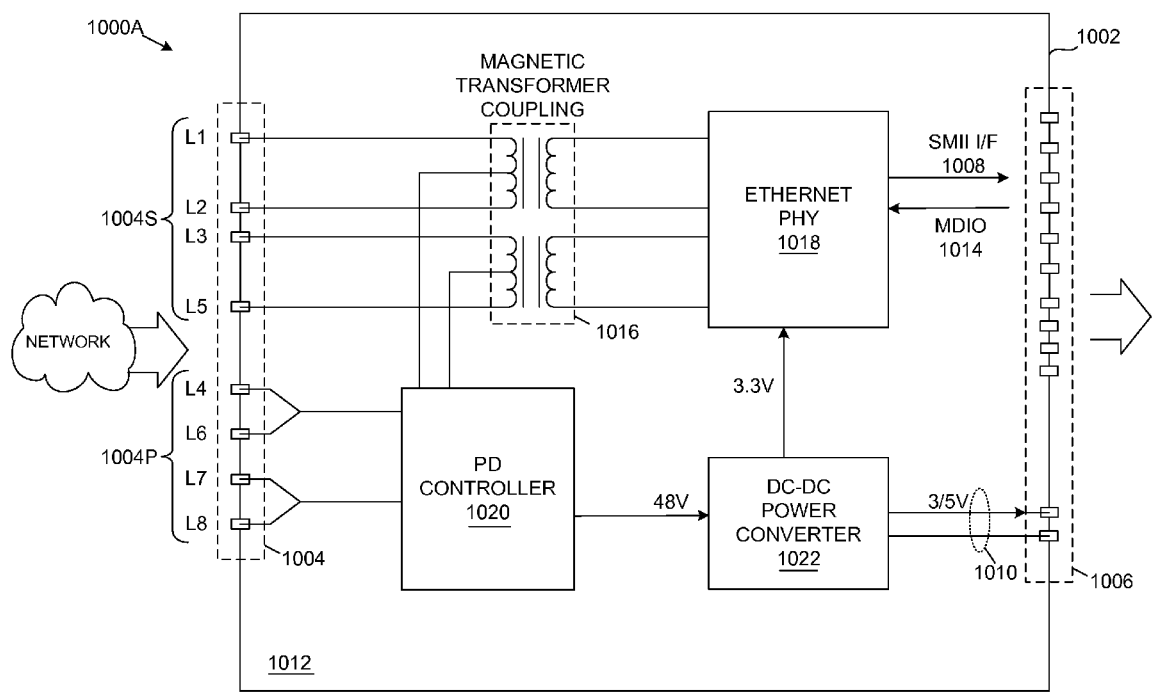
FIGS. 10A and 10B are schematic circuit and block diagrams illustrating embodiments of a network device arranged as a network interface module.

Referring to FIG. 10A, a schematic circuit and block diagram illustrates an embodiment of a network device 1000A arranged as a network interface module 1002. The network interface module 1002 comprises a network connector 1004 connected to the network interface module 1002 in a configuration that transfers power and communication signals and an application connector 1006. A Power-over-Ethernet (PoE) circuit 1012 is connected between the network connector 1004 and the application connector 1006. The PoE circuit 1012 comprises a transformer 1016 connected to communication signal pins 1004S of the network interface 1004 and an Ethernet physical layer (PHY) 1018 connected between the transformer 1016 and the application interface 1006. The Power-over-Ethernet (PoE) circuit 1012 can further comprise a Powered Ethernet Device (PD) controller 1020 coupled to power pins 1004P of the network interface 1004, and a Direct Current-Direct Current (DC-DC) power converter 1022 connected between the PD controller 1020 and power pins 1010 of the application interface 1006.

The illustrative network interface module 1002 is depicted as a powered device module. In a different application, the network interface module can be configured for usage as a power sourcing equipment interface module, for example in an implementation such as that shown in FIG. 5 where a Power-over-Ethernet (PoE) circuit can comprise a Power Sourcing Equipment (PSE) controller coupled between power pins of the network interface and power feed pins of the application interface.

Figure 10B:
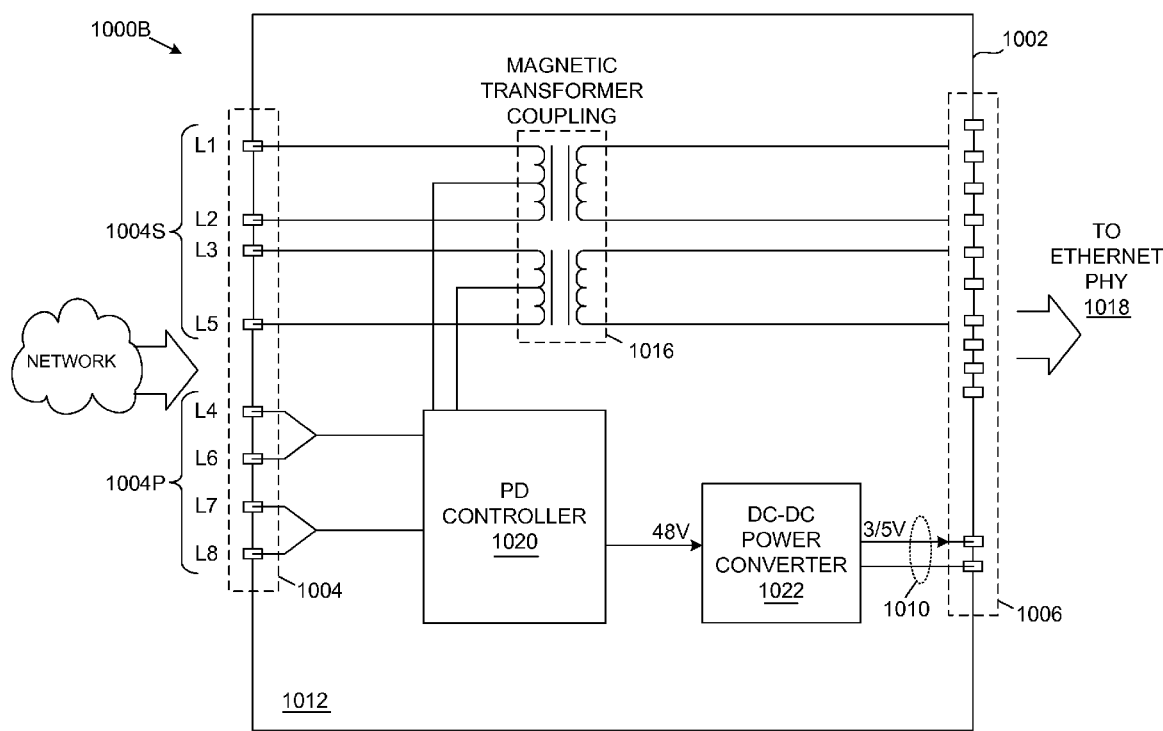

Referring to FIG. 10B, a schematic circuit and block diagram illustrates an embodiment of a network device 1000B arranged as a network interface module 1002. The network interface module 1002 comprises a network connector 1004 connected to the network interface module 1002 in a configuration that transfers power and communication signals and an application connector 1006. A Power-over-Ethernet (PoE) circuit 1012 is connected between the network connector 1004 and the application connector 1006 coupled to the network interface module 1002. The PoE circuit 1012 comprises a transformer 1016 connected to communication signal pins 1004S of the network interface 1004.

An Ethernet physical layer (PHY) 1018 external to the network interface module 1002 can be coupled to the transformer 1016 through the application interface 1006.

The Power-over-Ethernet (PoE) circuit 1012 can further comprise a Powered Ethernet Device (PD) controller 1020 coupled to power pins 1004P of the network interface 1004.

In some embodiments, the Power-over-Ethernet (PoE) circuit 1012 can further comprise a Direct Current-Direct Current (DC-DC) power converter 1022 connected between the PD controller 1020 and power pins 1010 of the application interface 1006.

Figure 11:
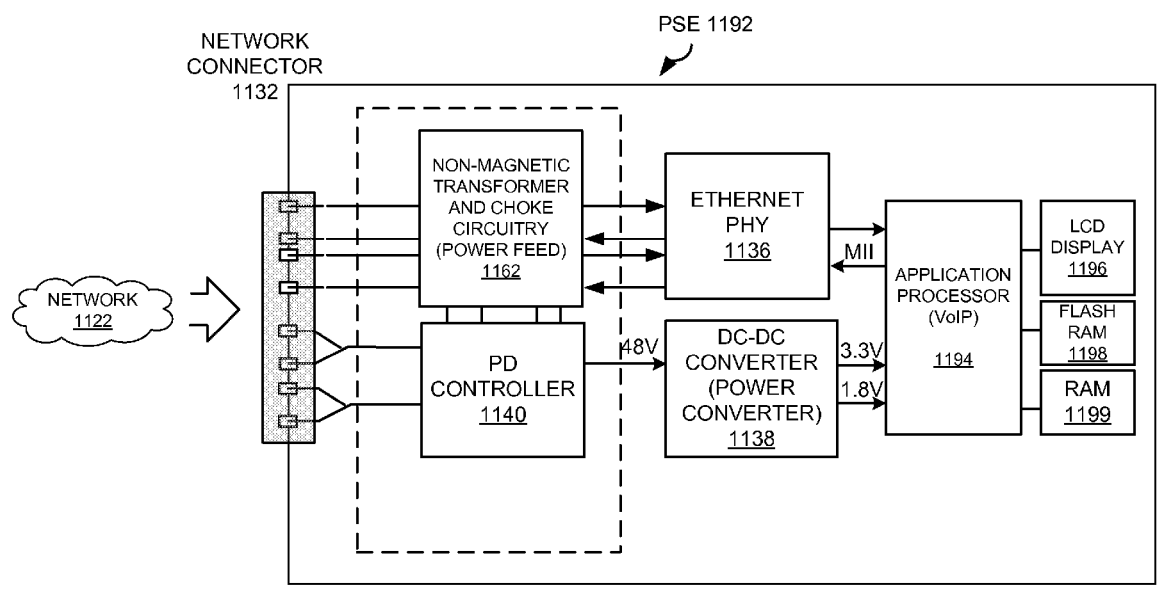
FIG. 11 (IDF1 FIG. 6) is a schematic block diagram showing an embodiment of a powered network device, for example an enterprise VoIP phone.

Referring to FIG. 11, a schematic block diagram shows an embodiment of a powered network device, for example a network attached appliance 1192. In this case, the network attached appliance is a VOIP telephone. Network connector 1132 takes form of an Ethernet network connector, such as RJ45 connector, and passes Ethernet signals to powerfeed circuitry 1162 and PD controller 1140. Non-magnetic transformer and choke power feed circuitry 1162 separates the data signal and power signal. The data signal is provided to network physical layer 1136. Network physical layer 1136 couples to a network MAC to execute the network hardware layer. An application specific processor, such as VOIP processor 1194 or related processors, couples to the network MAC. Additionally, the VOIP telephone processors and related circuitry (display 1196 and memory 1198 and 1199) may be powered by power converter 1138 using power fed and separated from the network signal by non-magnetic transformer and choke powerfeed circuitry 1162. In other embodiments, other network appliances, such as cameras, routers, printers and other like devices are envisioned.

In some embodiments, a network device 1192 can be configured to receive multiple power signals and data signals through a coupled network 1122. The network device 1192 comprises a network connector 1132 configured to physically couple the network device 1192 to the network 1222 and receive four twisted pairs that carry the power signals including, for example a first power signal and a second power signal. The network device 1192 further comprises an integrated circuit (IC) coupled to the network connector 1132 which comprises an Ethernet physical layer (PHY) module 1136, a power management module 1136. Isolation capacitors can be coupled between the Ethernet PHY module 1136 and an application device 1194 and an optical coupler can be coupled between the power management module 1140 and the application device 1194. A direct connection module is coupled to the network connector 1132 and operative to pass the received data signal(s) to the Ethernet PHY 1136, sense a current associated with the twisted pairs, actively balance current associated with the twisted pairs, and pass the received plurality of power signals to the power management module 1140 wherein the power management module is operative to at least partially power the network device 1192 from the received plurality of power signals.

Figure 12:
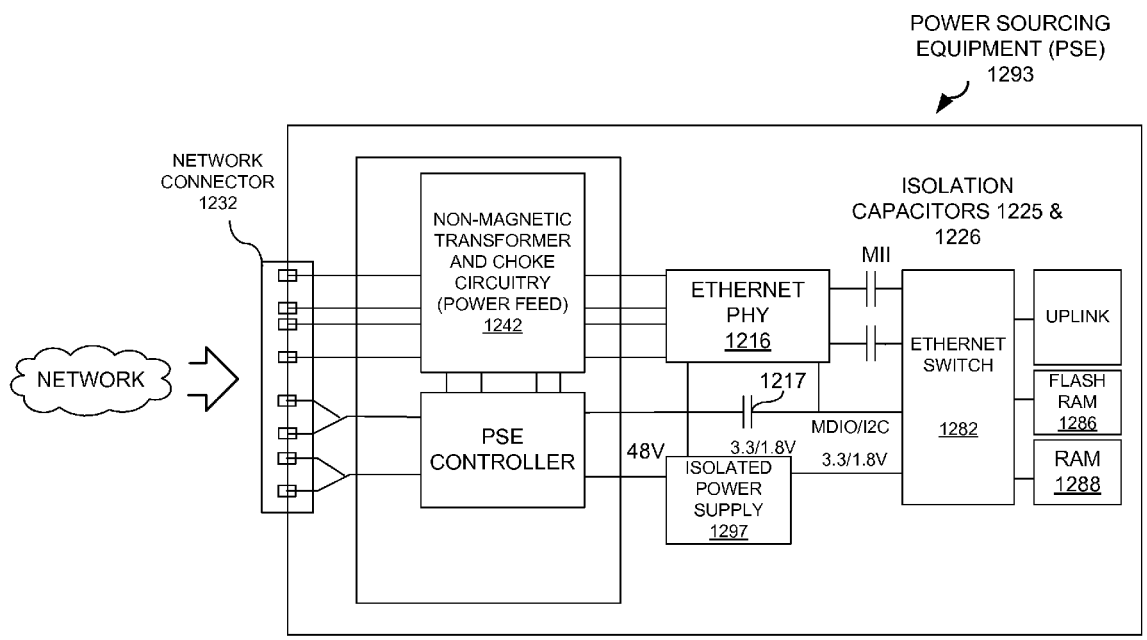

Referring to FIG. 12, a schematic functional block diagram illustrates an embodiment of a network device in a configuration of a network attached appliance 1292 including a power sourcing equipment (PSE) device. The network attached appliance is shown as a VoIP telephone. Network connector 1232 takes form of an Ethernet network connector, such as RJ45 connector, and passes Ethernet signals to power feed circuitry 1262 and PD controller 1240. Non-magnetic transformer and choke power feed circuitry 1262 separates the data signal and power signal. An optional connection to an external isolated power supply allows the network attached device to be powered when insufficient power is available or when more power is required than can be provided over the Ethernet connection. The data signal is provided to network physical layer 1236. Network physical layer 1236 couples to a network MAC to execute the network hardware layer. An application specific processor, such as VoIP processor 1294 or related processors, couples to the network MAC. Additionally, the VoIP telephone processors and related circuitry (display 1296 and memory 1298 and 1299) may be powered by power converter 1238 using power fed and separated from the network signal by non-magnetic transformer and choke power feed circuitry 1262. In other embodiments, other network appliances, such as cameras, routers, printers and other like devices are envisioned.

FIG. 12 is a functional block diagram of a specific network attached PSE device 1293. In this embodiment, PSE network device 1293 is an Ethernet router. Network connector 1232 may take the form of Ethernet network connector such as an RJ-45 connector, and is operable to distribute Ethernet signals that include both power and data as combined by the integrated circuits within PSE 1293. PSE 1293 includes an integrated circuit 1266 which serves as a nonmagnetic transformer and choke circuit.

The 1500 volt isolation between earth ground and the PSE network device may be achieved through various means. The data connections may be capacitively isolated, optically isolated or isolated using a transformer. The power connection is isolated using one or more isolated power supplies. Capacitors 1215, 1216 and optocoupler 1217 in FIG. 12 are one example of this isolation.

The PSE devices may be a single port or multi-port. As a single port this device can also be applied to a mid-span application. Data is provided to Ethernet physical layer 1254 either from network devices attached to network connector 1232 or data received from an external network via internet switch 1258 and an uplink. Ethernet switch 1258 could be an application specific processor or related processors that are operable to couple PSE 1293 via an uplink to an external network.

PSE devices may be integrated into various switches and routers for enterprise switching applications. However, in non-standard networks e.g. automotive etc., these PSE devices may be integrated into controller for the attached devices. In the case of multimedia or content distribution, these PSE devices may be incorporated into a controller/set-top box that distributes content and power to attached devices.

Nonmagnetic transformer and choke circuitry 1266 receives data from Ethernet physical layer 1254. Additionally, power is supplied to the nonmagnetic transformer and choke circuitry 1266 from isolated power supply 1297. In one embodiment this is a 48-volt power supply. However, this power distribution system may be applied to other power distribution systems, such as 110 volt systems as well. PSE controller 1256 receives the power signal from isolated power supply 1297 and is operable to govern the power signal content within the Ethernet signal supplied by nonmagnetic transformer and choke circuitry 1266. For example, PSE controller 1256 may limit the Ethernet power produced by nonmagnetic transformer and choke circuitry 1266 based on the requirements of an attached PD. Thus PSE controller 1256 is operable to ensure that attached network PDs are not overloaded and are given a proper power signal. Power supply 1297 also supplies as shown a power signal to Ethernet PHY 1254, Ethernet switch 1258.

Isolated power supply 1297 may be attached to an AC power supply or other internal or external power supply in order to provide a power signal to be distributed to network-attached devices that couple to PSE 1293. PSE controller 1256 may determine, in accordance with IEEE standard 802.3af, whether or not a network-attached device, in the case of an Ethernet-attached device, is a device operable to receive power from power supply equipment. When it is determined that an 802.3af compliant PD is attached to the network, PSE controller 1256 may supply power from power supply 1297 to nonmagnetic transformer and choke circuitry 1266, which is then provided to the downstream network-attached device through network connectors 1232.

The 802.3af Standard is intended to be fully compliant with all existing non-line powered Ethernet systems. As a result, the PSE network device is required to detect via a well defined procedure whether or not the far end network attached device is POE compliant and classify the amount of needed power prior to applying power to the system. Maximum allowed voltage is 57 volts to stay within the SELV (Safety Extra Low Voltage) limits.

In order to be backward compatible with non-powered systems the DC voltage applied will begin at a very low voltage and only begin to deliver power after confirmation that a POE device is present. During classification the PSE network device applies a voltage between 14.5V and 20.5V, and measures the current to determine the power class of the device.

The PSE network device enters a normal power supply mode after determining that the PD is ready to receive power. At this point the 48V supply is connected to the Ethernet cable. During the normal power supply mode, a maintain power signature is sensed by the PSE to continue supplying power. The maximum current allowed is limited by the power class of the network attached device.

In some embodiments, a power source equipment (PSE) network device 1293 operative to distribute a network power signal and a network data signal through a coupled network and comprises a network connector 1232 configured to physically couple the PSE network device 1293 to the network, and an integrated circuit (IC) coupled to the network connector 1232 that further comprises a power feed circuit 1242 which exchanges data signals with a network physical layer (PHY) module 1216, an Ethernet switch 1282, and the network connector 1232. The integrated circuit also isolates the network PHY module 1216 from the Ethernet switch 1282, and passes the power signal to the network connector 1232 as directed by a power source equipment (PSE) controller. The power signal is received from an isolated power supply.

In some embodiments, power can be supplied from a power source equipment (PSE) network device 1293 with an Ethernet power signal fed through an Ethernet network connection by producing the Ethernet power signal from power supplied by an isolated power supply 1297 in an integrated circuit (IC) within the PSE network device 1293. The PSE network device 1293 is physically coupled to the isolated power supply and physically coupled to an Ethernet network. An Ethernet data signal and the Ethernet power signal are combined within the IC to produce an Ethernet signal. Ground isolation is provided for the Ethernet data signal and the Ethernet power signal. The Ethernet signal is exchanged with at least one Ethernet network power device (PD) which is physically coupled to the Ethernet network 1222 within the PSE network device 1293. The IC is isolated from the one or more Ethernet network power devices.

In various embodiments, a power source equipment (PSE) network device 1293 can be operative to distribute an Ethernet power signal and an Ethernet data signal through a coupled Ethernet network. The illustrative PSE network device 1293 comprises an Ethernet network connector 1232 configured to physically couple the PSE network device 1293 to the Ethernet network, a PSE controller, an Ethernet physical layer (PHY) module 1216 configured to couple the PSE network device 1293 to a multiport switch 1282 at an isolated interface 1225, 1226; and an integrated circuit (IC). The IC is coupled to the Ethernet network connector 1232 that further comprises a power feed circuit 1242 which is configured to exchange Ethernet data signals with the Ethernet PHY module 1216 and the Ethernet connector 1232, supply a power signal from a power supply to the PSE network device 1293, and produce and pass the Ethernet power signal to the Ethernet connector 1232 as directed by the PSE controller.

Although the description herein may focus and describe a system and method for coupling high bandwidth data signals and power distribution between the integrated circuit and cable that uses transformer-less ICs with particular detail to the IEEE 802.3af Ethernet standard, the concepts may be applied in non-Ethernet applications and non-IEEE 802.3af applications. Also, the concepts may be applied in subsequent standards that supersede or complement the IEEE 802.3af standard.

Various embodiments of the depicted system may support solid state, and thus non-magnetic, transformer circuits operable to couple high bandwidth data signals and power signals with new mixed-signal IC technology, enabling elimination of cumbersome, real-estate intensive magnetic-based transformers.

Typical conventional communication systems use transformers to perform common mode signal blocking, 1500 volt isolation, and AC coupling of a differential signature as well as residual lightning or electromagnetic shock protection. The functions are replaced by a solid state or other similar circuits in accordance with embodiments of circuits and systems described herein whereby the circuit may couple directly to the line and provide high differential impedance and low common mode impedance. High differential impedance enables separation of the physical layer (PHY) signal from the power signal. Low common mode impedance enables elimination of a choke, allowing power to be tapped from the line. The local ground plane may float to eliminate a requirement for 1500 volt isolation. Additionally, through a combination of circuit techniques and lightning protection circuitry, voltage spike or lightning protection can be supplied to the network attached device, eliminating another function performed by transformers in traditional systems or arrangements. The disclosed technology may be applied anywhere transformers are used and is not limited to Ethernet applications.

Specific embodiments of the circuits and systems disclosed herein may be applied to various powered network attached devices or Ethernet network appliances. Such appliances include, but are not limited to VoIP telephones, routers, printers, and other similar devices.

The IEEE 802.3 Ethernet Standard, which is incorporated herein by reference, addresses loop powering of remote Ethernet devices (802.3af). Power over Ethernet (PoE) standard and other similar standards support standardization of power delivery over Ethernet network cables to power remote client devices through the network connection. The side of link that supplies power is called Powered Supply Equipment (PSE). The side of link that receives power is the Powered device (PD). Other implementations may supply power to network attached devices over alternative networks such as, for example, Home Phoneline Networking alliance (HomePNA) local area networks and other similar networks. HomePNA uses existing telephone wires to share a single network connection within a home or building. In other examples, devices may support communication of network data signals over power lines.

In various configurations described herein, a magnetic transformer of conventional systems may be eliminated while transformer functionality is maintained. Techniques enabling replacement of the transformer may be implemented in the form of integrated circuits (ICs) or discrete components.

Figure 1B:
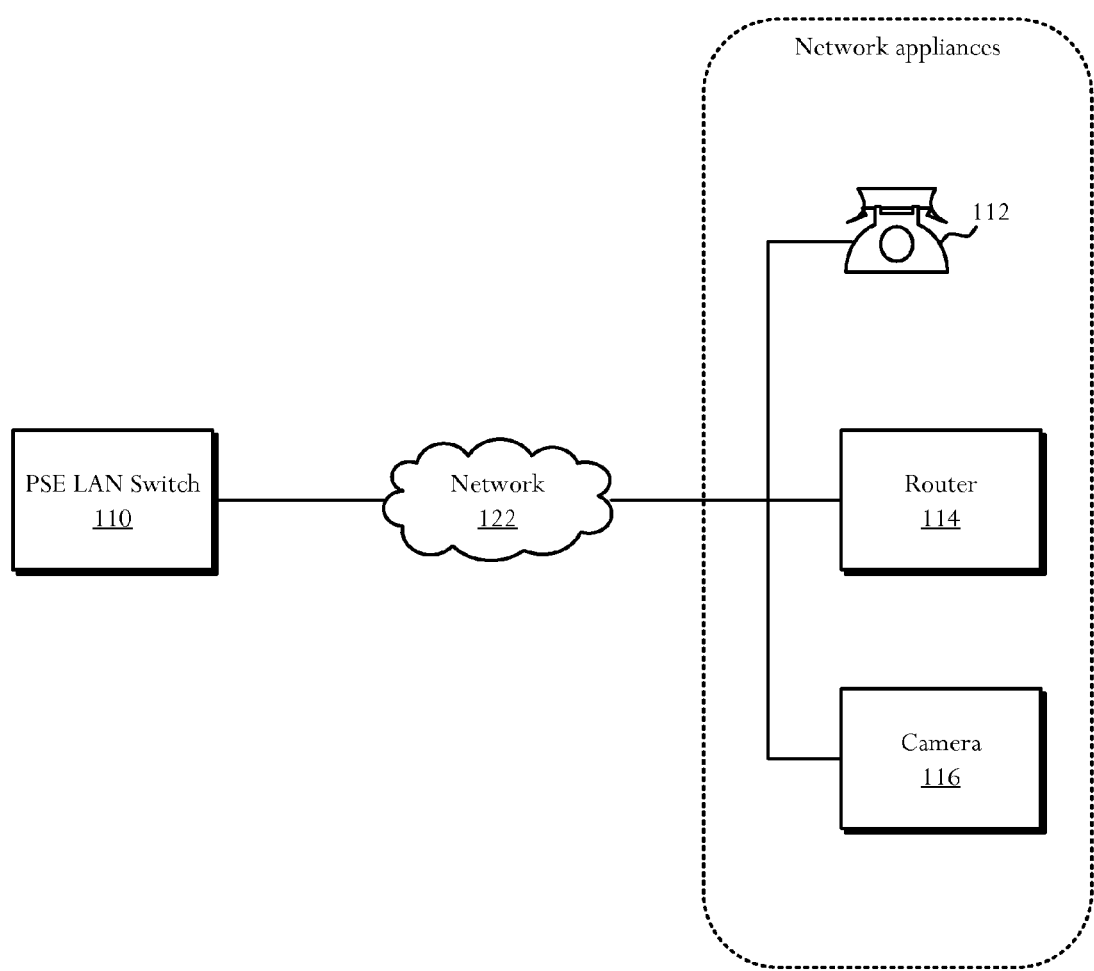

FIG. 1A is a schematic block diagram that illustrates a high level example embodiment of devices in which power is supplied separately to network attached client devices 112 through 116 that may benefit from receiving power and data via the network connection. The devices are serviced by a local area network (LAN) switch 110 for data. Individual client devices 112 through 116 have separate power connections 118 to electrical outlets 120. FIG. 1B is a schematic block diagram that depicts a high level example embodiment of devices wherein a switch 110 is a power supply equipment (PSE)-capable power-over Ethernet (PoE) enabled LAN switch that supplies both data and power signals to client devices 112 through 116. Network attached devices may include a Voice Over Internet Protocol (VOIP) telephone 112, access points, routers, gateways 114 and/or security cameras 116, as well as other known network appliances. Network supplied power enables client devices 112 through 116 to eliminate power connections 118 to electrical outlets 120 as shown in FIG. 1A. Eliminating the second connection enables the network attached device to have greater reliability when attached to the network with reduced cost and facilitated deployment.

Figure 2:
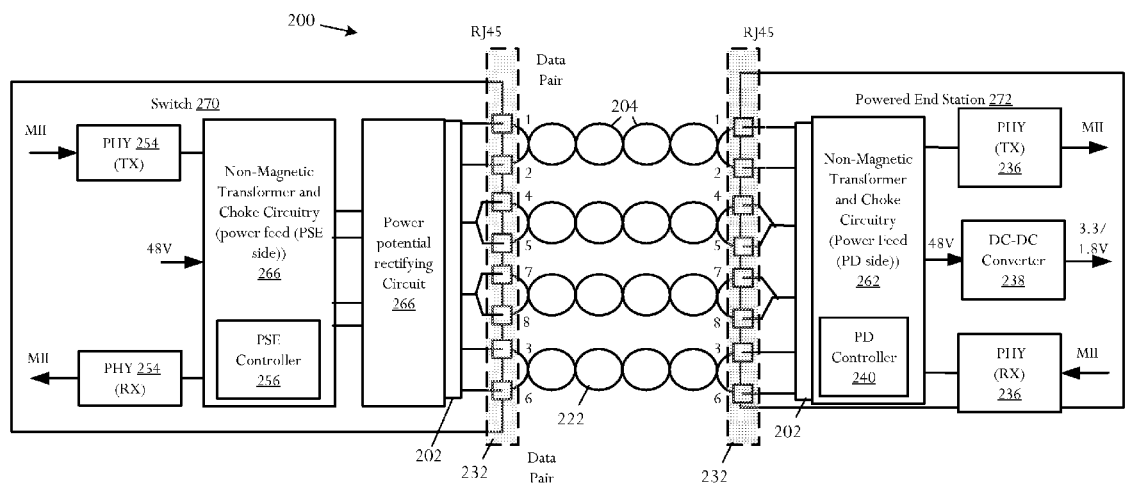
FIG. 2 is a functional block diagram illustrating a network interface including a network powered device (PD) interface and a network power supply equipment (PSE) interface, each implementing a non-magnetic transformer and choke circuitry.

Referring to FIG. 2, a functional block diagram depicts an embodiment of a network device 200 including a T-Less Connect™ solid-state transformer. The illustrative network device comprises a power potential rectifier 202 adapted to conductively couple a network connector 232 to an integrated circuit 270, 272 that rectifies and passes a power signal and data signal received from the network connector 232. The power potential rectifier 202 regulates a received power and/or data signal to ensure proper signal polarity is applied to the integrated circuit 270, 272.

The network device 200 is shown with the power sourcing switch 270 sourcing power through lines 1 and 2 of the network connector 232 in combination with lines 3 and 6.

In some embodiments, the power potential rectifier 202 is configured to couple directly to lines of the network connector 232 and regulate the power signal whereby the power potential rectifier 202 passes the data signal with substantially no degradation.

In some configuration embodiments, the network connector 232 receives multiple twisted pair conductors 204, for example twisted 22-26 gauge wire. Any one of a subset of the twisted pair conductors 204 can forward bias to deliver current and the power potential rectifier 202 can forward bias a return current path via a remaining conductor of the subset.

FIG. 2 illustrates the network interface 200 including a network powered device (PD) interface and a network power supply equipment (PSE) interface, each implementing a non-magnetic transformer and choke circuitry. A powered end station 272 is a network interface that includes a network connector 232, non-magnetic transformer and choke power feed circuitry 262, a network physical layer 236, and a power converter 238. Functionality of a magnetic transformer is replaced by circuitry 262. In the context of an Ethernet network interface, network connector 232 may be a RJ45 connector that is operable to receive multiple twisted wire pairs. Protection and conditioning circuitry may be located between network connector 232 and non-magnetic transformer and choke power feed circuitry 262 to attain surge protection in the form of voltage spike protection, lighting protection, external shock protection or other similar active functions. Conditioning circuitry may be a diode bridge or other rectifying component or device. A bridge or rectifier may couple to individual conductive lines 1-8 contained within the RJ45 connector. The circuits may be discrete components or an integrated circuit within non-magnetic transformer and choke power feed circuitry 262.

In an Ethernet application, the IEEE 802.3af standard (PoE standard) enables delivery of power over Ethernet cables to remotely power devices. The portion of the connection that receives the power may be referred to as the powered device (PD). The side of the link that supplies power is called the power sourcing equipment (PSE).

In the powered end station 272, conductors 1 through 8 of the network connector 232 couple to non-magnetic transformer and choke power feed circuitry 262. Non-magnetic transformer and choke power feed circuitry 262 may use the power feed circuit and separate the data signal portion from the power signal portion. The data signal portion may then be passed to the network physical layer (PHY) 236 while the power signal passes to power converter 238.

If the powered end station 272 is used to couple the network attached device or PD to an Ethernet network, network physical layer 236 may be operable to implement the 10 Mbps, 100 Mbps, and/or 1 Gbps physical layer functions as well as other Ethernet data protocols that may arise. The Ethernet PHY 236 may additionally couple to an Ethernet media access controller (MAC). The Ethernet PHY 236 and Ethernet MAC when coupled are operable to implement the hardware layers of an Ethernet protocol stack. The architecture may also be applied to other networks. If a power signal is not received but a traditional, non-power Ethernet signal is received the non-magnetic power feed circuitry 262 still passes the data signal to the network PHY.

The power signal separated from the network signal within non-magnetic transformer and choke power feed circuit 262 by the power feed circuit is supplied to power converter 238. Typically the power signal received does not exceed 57 volts SELV (Safety Extra Low Voltage). Typical voltage in an Ethernet application is 48-volt power. Power converter 238 may then further transform the power as a DC to DC converter to provide 1.8 to 3.3 volts, or other voltages specified by many Ethernet network attached devices.

Power-sourcing switch 270 includes a network connector 232, Ethernet or network physical layer 254, PSE controller 256, non-magnetic transformer and choke power supply circuitry 266, and possibly a multiple-port switch. Transformer functionality is supplied by non-magnetic transformer and choke power supply circuitry 266. Power-sourcing switch 270 may be used to supply power to network attached devices. Powered end station 272 and power sourcing switch 270 may be applied to an Ethernet application or other network-based applications such as, but not limited to, a vehicle-based network such as those found in an automobile, aircraft, mass transit system, or other like vehicle. Examples of specific vehicle-based networks may include a local interconnect network (LIN), a controller area network (CAN), or a flex ray network. All may be applied specifically to automotive networks for the distribution of power and data within the automobile to various monitoring circuits or for the distribution and powering of entertainment devices, such as entertainment systems, video and audio entertainment systems often found in today's vehicles. Other networks may include a high speed data network, low speed data network, time-triggered communication on CAN (TTCAN) network, a J1939-compliant network, ISO11898-compliant network, an ISO11519-2-compliant network, as well as other similar networks. Other embodiments may supply power to network attached devices over alternative networks such as but not limited to a Home-PNA local area network and other similar networks. Home-PNA uses existing telephone wires to share a single network connection within a home or building. Alternatively, embodiments may be applied where network data signals are provided over power lines.

Non-magnetic transformer and choke power feed circuitry 262 and 266 enable elimination of magnetic transformers with integrated system solutions that enable an increase in system density by replacing magnetic transformers with solid state power feed circuitry in the form of an integrated circuit or discreet component.

In some embodiments, non-magnetic transformer and choke power feed circuitry 262, network physical layer 236, power distribution management circuitry 254, and power converter 238 may be integrated into a single integrated circuit rather than discrete components at the printed circuit board level. Optional protection and power conditioning circuitry may be used to interface the integrated circuit to the network connector 232.

The Ethernet PHY may support the 10/100/1000 Mbps data rate and other future data networks such as a 10000 Mbps Ethernet network. Non-magnetic transformer and choke power feed circuitry 262 supplies line power minus the insertion loss directly to power converter 238, converting power first to a 12V supply then subsequently to lower supply levels. The circuit may be implemented in any appropriate process, for example a 0.18 or 0.13 micron process or any suitable size process.

Non-magnetic transformer and choke power feed circuitry 262 may implement functions including IEEE 802.3.af signaling and load compliance, local unregulated supply generation with surge current protection, and signal transfer between the line and integrated Ethernet PHY. Since devices are directly connected to the line, the circuit may be implemented to withstand a secondary lightning surge.

For the power over Ethernet (PoE) to be IEEE 802.3af standard compliant, the PoE may be configured to accept power with various power feeding schemes and handle power polarity reversal. A rectifier, such as a diode bridge, a switching network, or other circuit, may be implemented to ensure power signals having an appropriate polarity are delivered to nodes of the power feed circuit. Any one of the conductors 1, 4, 7 or 3 of the network RJ45 connection can forward bias to deliver current and any one of the return diodes connected can forward bias to form a return current path via one of the remaining conductors. Conductors 2, 5, 8 and 4 are connected similarly.

Non-magnetic transformer and choke power feed circuitry 262 applied to PSE may take the form of a single or multiple port switch to supply power to single or multiple devices attached to the network. Power sourcing switch 270 may be operable to receive power and data signals and combine to communicate power signals which are then distributed via an attached network. If power sourcing switch 270 is a gateway or router, a high-speed uplink couples to a network such as an Ethernet network or other network. The data signal is relayed via network PHY 254 and supplied to non-magnetic transformer and choke power feed circuitry 266. PSE switch 270 may be attached to an AC power supply or other internal or external power supply to supply a power signal to be distributed to network-attached devices that couple to power sourcing switch 270. Power controller 256 within or coupled to non-magnetic transformer and choke power feed circuitry 266 may determine, in accordance with IEEE standard 802.3af, whether a network-attached device in the case of an Ethernet network-attached device is a device operable to receive power from power supply equipment. When determined that an IEEE 802.3af compliant powered device (PD) is attached to the network, power controller 256 may supply power from power supply to non-magnetic transformer and choke power feed circuitry 266, which is sent to the downstream network-attached device through network connectors, which in the case of the Ethernet network may be an RJ45 receptacle and cable.

IEEE 802.3af Standard is to fully comply with existing non-line powered Ethernet network systems. Accordingly, PSE detects via a well-defined procedure whether the far end is PoE compliant and classify sufficient power prior to applying power to the system. Maximum allowed voltage is 57 volts for compliance with SELV (Safety Extra Low Voltage) limits.

For backward compatibility with non-powered systems, applied DC voltage begins at a very low voltage and only begins to deliver power after confirmation that a PoE device is present. In the classification phase, the PSE applies a voltage between 14.5V and 20.5V, measures the current and determines the power class of the device. In one embodiment the current signature is applied for voltages above 12.5V and below 23 Volts. Current signature range is 0-44 mA.

The normal powering mode is switched on when the PSE voltage crosses 42 Volts where power MOSFETs are enabled and the large bypass capacitor begins to charge.

A maintain power signature is applied in the PoE signature block—a minimum of 10 mA and a maximum of 23.5 kohms may be applied for the PSE to continue to feed power. The maximum current allowed is limited by the power class of the device (class 0-3 are defined). For class 0, 12.95 W is the maximum power dissipation allowed and 400 ma is the maximum peak current. Once activated, the PoE will shut down if the applied voltage falls below 30V and disconnect the power MOSFETs from the line.

Power feed devices in normal power mode provide a differential open circuit at the Ethernet signal frequencies and a differential short at lower frequencies. The common mode circuit presents the capacitive and power management load at frequencies determined by the gate control circuit.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, component values, integrated circuit process variations, temperature variations, rise and fall times, and/or thermal noise. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, various aspects or portions of a network interface are described including several optional implementations for particular portions. Any suitable combination or permutation of the disclosed designs may be implemented.

What is claimed is:

1. A network device comprising:
 a network attached appliance characterized by a twenty-or-fewer in footprint comprising:
  a housing;
  an application processor contained within the housing; and
  a connector module contained within the housing and configured to couple the application processor to a network, the connector module comprising:
   a network connector coupled to the connector module in a configuration that transfers power and communication signals;
   an application connector coupled to the connector module and configured for coupling to the application processor; and
   a Power-over-Ethernet (PoE) circuit coupled between the network connector and the application connector.

2. The network device according to claim 1 further comprising:
 the Power-over-Ethernet (PoE) circuit comprising:
  an integrated Powered Ethernet Device (iPED) comprising:
   a non-magnetic transformer and choke circuit integrated into the iPED and coupled between communication signal pins of the network interface and the application interface;
   a Powered Ethernet Device (PD) controller integrated into the iPED and coupled to power pins of the network interface; and
   a Direct Current-Direct Current (DC-DC) power converter integrated into the iPED and coupled between the PD controller and power pins of the application interface.

3. The network device according to claim 2 further comprising:
 the integrated Powered Ethernet Device (iPED) further comprising:
  isolation capacitors coupled between the non-magnetic transformer and choke circuit and the application interface; and
  at least one optical coupler coupled between the Powered Ethernet Device (PD) and the application interface.

4. The network device according to claim 1 further comprising:
 the network attached appliance further comprising:
  an Ethernet physical layer (PHY) coupled between the application interface and the application processor, the Ethernet PHY coupled to the application processor by a SMII interface and a Management Data Input/Output (MDIO) interface.

5. The network device according to claim 1 further comprising:
 the Power-over-Ethernet (PoE) circuit comprising:
  an integrated Powered Ethernet Device (iPED) comprising:
   a non-magnetic transformer and choke circuit integrated into the iPED and coupled between communication signal pins of the network interface and the application interface;
   an Ethernet physical layer (PHY) integrated into the iPED and coupled between the non-magnetic transformer and choke circuit and the application interface, the Ethernet PHY coupled to the application interface by a SMII interface and a Management Data Input/Output (MDIO) interface;
   a Powered Ethernet Device (PD) controller integrated into the iPED and coupled to power pins of the network interface; and
   a Direct Current-Direct Current (DC-DC) power converter integrated into the iPED and coupled between the PD controller and power pins of the application interface.

6. The network device according to claim 1 further comprising:
 the Power-over-Ethernet (PoE) circuit comprising:
  an integrated Powered Ethernet Device (iPED) comprising:
   an isolated Ethernet physical layer (PHY) integrated into the iPED and coupled to the application interface by a SMII interface and a Management Data Input/Output (MDIO) interface;
   a Powered Ethernet Device (PD) controller integrated into the iPED and coupled to power pins of the network interface; and
   an isolated Direct Current-Direct Current (DC-DC) power converter integrated into the iPED and coupled between the PD controller and power pins of the application interface.

7. The network device according to claim 6 further comprising:
the Power-over-Ethernet (PoE) circuit comprising:
an integrated Powered Ethernet Device (iPED) further comprising:
an autotransformer integrated into the iPED and coupled between communication signal pins of the network interface and the application interface.

8. The network device according to claim 7 further comprising:
the Power-over-Ethernet (PoE) circuit comprising:
an integrated Powered Ethernet Device (iPED) further comprising:
isolation capacitors coupled to the autotransformer and integrated into the iPED coupled between communication signal pins of the network interface and the application interface.

9. The network device according to claim 6 further comprising:
the isolated Ethernet physical layer (PHY) further comprising:
isolation capacitors coupled to the SMII interface and the MDIO interface.

10. The network device according to claim 6 further comprising:
an isolation barrier formed by the isolated Ethernet physical layer (PHY) and the isolated Direct Current-Direct Current (DC-DC) power converter isolating the network interface and the application interface.

11. A network device comprising:
a network interface module characterized by a twenty-or-fewer pin footprint comprising:
a network connector coupled to the network interface module in a configuration that transfers power and communication signals;
an application connector coupled to the network interface module; and
a Power-over-Ethernet (PoE) circuit coupled between the network connector and the application connector, the PoE circuit comprising:
a transformer coupled to communication signal pins of the network interface module.

12. The network device according to claim 11 further comprising:
an Ethernet physical layer (PHY) external to the network interface module coupled to the transformer through the application interface.

13. The network device according to claim 11 further comprising:
the Power-over-Ethernet (PoE) circuit further comprising:
a Powered Ethernet Device (PD) controller coupled to power pins of the network interface.

14. The network device according to claim 11 further comprising:
the Power-over-Ethernet (PoE) circuit further comprising:
a Direct Current-Direct Current (DC-DC) power converter coupled between the PD controller and power pins of the application interface.

15. A network device comprising:
a power sourcing equipment appliance characterized by a twenty-or-fewer pin footprint comprising:
a housing;
an Ethernet switch contained within the housing;
an isolated power supply contained within the housing; and
a connector module contained within the housing and configured to couple the Ethernet switch and the isolated power supply to a network, the connector module comprising:
a network connector coupled to the connector module in a configuration that transfers power and communication signals;
an application connector coupled to the connector module and comprising serial media independent interface (SMII) pins and power pins; and
a Power-over-Ethernet (PoE) circuit coupled between the network connector and the application connector comprising:
an integrated Powered Ethernet Source (iPES) comprising:
an isolated Ethernet physical layer (PHY) integrated into the iPES coupled to the application interface by a SMII interface and a Management Data Input/Output (MDIO) interface; and
a Power Sourcing Equipment (PSE) controller coupled to power feed pins of the application interface.

16. The network device according to claim 15 further comprising:
the Power-over-Ethernet (PoE) circuit comprising:
an integrated Powered Ethernet Source (iPES) further comprising:
an autotransformer integrated into the iPED and coupled between communication signal pins of the network interface and the application interface.

17. The network device according to claim 16 further comprising:
the Power-over-Ethernet (PoE) circuit comprising:
an integrated Powered Ethernet Source (iPES) further comprising:
isolation capacitors coupled to the autotransformer and integrated into the iPES coupled between communication signal pins of the network interface and the application interface.

18. The network device according to claim 15 further comprising:
the isolated Ethernet physical layer (PHY) further comprising:
isolation capacitors coupled to the SMII interface and the MDIO interface.

19. The network device according to claim 15 further comprising:
a Buck converter integrated into the integrated Powered Ethernet Source (iPES) and coupled to a power line supplying the isolated Ethernet physical layer (PHY) from the isolated power supply.

20. The network device according to claim 15 further comprising:
an isolation barrier formed by the isolated Ethernet physical layer (PHY) and the isolated Direct Current-Direct Current (DC-DC) power converter isolating the network interface and the application interface.

21. A network device configured to receive a plurality of power signals and data signals through a coupled network comprising:
a network connector characterized by a twenty-or-fewer pin footprint configured to physically couple the network device to the network and receive four twisted pairs that carry the plurality of power signals, wherein the plurality of power signals comprise a first power signal and a second power signal; and an integrated circuit (IC) coupled to the network connector and comprising:
an Ethernet physical layer (PHY) module;
a power management module;
isolation capacitors coupled between the Ethernet PHY module and an application device;
an optical coupler coupled between the power management module and the application device; and
a direct connection module coupled to the network connector and operative to:
pass the received data signal(s) to the Ethernet PHY;
sense a current associated with the twisted pairs;
actively balance current associated with the twisted pairs; and
pass the received plurality of power signals to the power management module wherein the power management module is operative to at least partially power the network device from the received plurality of power signals.

22. A power source equipment (PSE) network device operative to distribute a network power signal and a network data signal through a coupled network comprising:
a network connector characterized by a twenty-or-fewer pin footprint configured to physically couple the PSE network device to the network; and
an integrated circuit (IC) coupled to the network connector that further comprises
a power feed circuit operative to:
exchange data signals with a network physical layer (PHY) module, Ethernet switch, and the network connector;
isolate the network PHY module from the Ethernet switch; and
pass the power signal to the network connector as directed by a power source equipment (PSE) controller, wherein the power signal is received from an isolated power supply.

23. A method for supplying power from a power source equipment (PSE) network device with an Ethernet power signal fed through an Ethernet network connector comprising:
providing an Ethernet network connector characterized by a twenty-or-fewer pin footprint;
producing the Ethernet power signal from power supplied by an isolated power supply in an integrated circuit (IC) within the PSE network device;
physically coupling the PSE network device to the isolated power supply;
physically coupling the PSE network device to an Ethernet network;
combining within the IC an Ethernet data signal and the Ethernet power signal to produce an Ethernet signal;
providing ground isolation for the Ethernet data signal and the Ethernet power signal;
exchanging the Ethernet signal with at least one Ethernet network power device (PD) physically coupled to the Ethernet network within the PSE network device; and
isolating the IC from the at least one Ethernet network power device.

24. A power source equipment (PSE) network device operative to distribute an Ethernet power signal and an Ethernet data signal through a coupled Ethernet network comprising:
an Ethernet network connector characterized by a twenty-or-fewer pin footprint and configured to physically couple the PSE network device to the Ethernet network;
a PSE controller;
an Ethernet physical layer (PHY) module configured to couple the PSE network device to a multiport switch at an isolated interface; and
an integrated circuit (IC) coupled to the Ethernet network connector that further comprises a power feed circuit configured to:
exchange Ethernet data signals with the Ethernet PHY module and the Ethernet connector;
supply a power signal from a power supply to the PSE network device; and
produce and pass the Ethernet power signal to the Ethernet connector as directed by the PSE controller.

* * * * *